(12) United States Patent
Chiang et al.

(10) Patent No.: US 10,737,867 B2
(45) Date of Patent: Aug. 11, 2020

(54) CONTAINER FOR TRANSPORT AND STORAGE OF FOOD PRODUCTS

(71) Applicant: ZUME, INC., Mountain View, CA (US)

(72) Inventors: Casper W. Chiang, Danville, CA (US); Douglas J. Minkler, Mill Valley, CA (US); Julia Collins, San Francisco, CA (US); Alexander John Garden, Tiburon, CA (US); Chester Wajda, San Francisco, CA (US)

(73) Assignee: ZUME, INC., Mountain View, CA (US)

( * ) Notice: Subject to any disclaimer, the term of this patent is extended or adjusted under 35 U.S.C. 154(b) by 0 days.

(21) Appl. No.: 15/936,069

(22) Filed: Mar. 26, 2018

(65) Prior Publication Data

US 2018/0215523 A1    Aug. 2, 2018

Related U.S. Application Data

(63) Continuation of application No. 15/845,916, filed on Dec. 18, 2017, which is a continuation of application No. 15/465,228, filed on Mar. 21, 2017.
(Continued)

(51) Int. Cl.
*B65D 21/02* (2006.01)
*B65D 81/26* (2006.01)
(Continued)

(52) U.S. Cl.
CPC .......... *B65D 81/261* (2013.01); *A47J 47/145* (2013.01); *B65D 21/0217* (2013.01);
(Continued)

(58) Field of Classification Search
CPC ............ B65D 21/0223; B65D 21/0215; B65D 21/023; B65D 81/261; A47J 47/145
See application file for complete search history.

(56) References Cited

U.S. PATENT DOCUMENTS

| 1,236,360 A | 8/1917 | Rice |
| 1,587,288 A | 6/1926 | Dooly |

(Continued)

FOREIGN PATENT DOCUMENTS

| AU | 1977025870 | 6/1976 |
| AU | 2018211256 | 8/2018 |

(Continued)

OTHER PUBLICATIONS

Advisory Action, dated Aug. 27, 2015, for U.S. Appl. No. 13/920,998, Garden, "Systems and Methods of Preparing Food Products," 3 pages.
(Continued)

*Primary Examiner* — Andrew T Kirsch

(57) ABSTRACT

Systems and methods for providing compostable food containers which preserve the quality of a food product for an extended duration of time, and which optionally allow for cooking of the food product therein. In some implementations, the food containers are sturdy, stackable, insulating, and require minimal or no manual labor to assemble. In some implementations, the food container includes a base and a cover which cooperate to form a closed chamber for supporting, protecting, insulating and optionally cooking a food product, such as a pizza. The base and cover may each be formed of a single layer of material including, but not limited to, molded sugarcane fiber ("bagasse"), molded wood fiber, molded bamboo fiber, molded paper or plastic.

23 Claims, 23 Drawing Sheets

Related U.S. Application Data

(60) Provisional application No. 62/311,787, filed on Mar. 22, 2016.

(51) Int. Cl.
 A47J 47/14 (2006.01)
 B65D 43/02 (2006.01)
 B65D 65/46 (2006.01)
 B65D 25/04 (2006.01)
 B65D 25/24 (2006.01)
 B65D 85/30 (2006.01)
 B65D 85/00 (2006.01)

(52) U.S. Cl.
 CPC ......... B65D 21/0223 (2013.01); B65D 25/04 (2013.01); B65D 25/24 (2013.01); B65D 43/0204 (2013.01); B65D 65/466 (2013.01); B65D 85/30 (2013.01); B65D 85/70 (2013.01); B65D 2543/00092 (2013.01); B65D 2543/00296 (2013.01); B65D 2543/00361 (2013.01); B65D 2543/00416 (2013.01); B65D 2543/00574 (2013.01); B65D 2585/366 (2013.01); Y02W 90/11 (2015.05); Y02W 90/14 (2015.05)

(56) References Cited

U.S. PATENT DOCUMENTS

| | | |
|---|---|---|
| 1,718,668 A | 6/1929 | Smythe |
| 2,301,510 A | 11/1942 | Bolen |
| 3,132,423 A | 5/1964 | De Lano |
| 3,155,303 A | 11/1964 | Fenkel |
| 3,268,198 A | 8/1966 | Swett |
| 3,392,468 A * | 7/1968 | Wolf ............... B65D 51/245 116/307 |
| D215,766 S | 10/1969 | Dusek |
| 3,664,256 A | 5/1972 | Peirce |
| D223,854 S | 6/1972 | Swett |
| 3,929,564 A * | 12/1975 | Reifers ............. B65D 1/34 162/224 |
| 3,954,178 A | 5/1976 | Mason, Jr. |
| 3,985,991 A | 10/1976 | Levinson |
| D242,108 S | 11/1976 | Dart |
| D243,912 S | 4/1977 | Daenen |
| D244,065 S | 4/1977 | Daenen |
| D245,384 S | 8/1977 | Ashton |
| 4,061,241 A | 12/1977 | Retelny |
| 4,120,398 A | 10/1978 | Braddon |
| 4,127,189 A | 11/1978 | Shumrak et al. |
| D252,008 S | 6/1979 | Jeambey |
| 4,197,940 A | 4/1980 | DeRossett |
| 4,360,118 A | 11/1982 | Stern |
| 4,373,633 A | 2/1983 | Lutz, Sr. |
| 4,373,636 A | 2/1983 | Hoffman |
| 4,498,586 A | 2/1985 | Vitale |
| 4,632,836 A | 12/1986 | Abbott et al. |
| 4,656,068 A | 4/1987 | Raines |
| 4,816,646 A | 3/1989 | Solomon et al. |
| 4,886,179 A | 12/1989 | Volk |
| D306,118 S | 2/1990 | Guerrero |
| D307,243 S | 4/1990 | Baker |
| 4,919,477 A | 4/1990 | Bingham et al. |
| 5,101,997 A | 4/1992 | Bagwell et al. |
| D333,754 S | 3/1993 | Conti |
| 5,215,775 A | 6/1993 | Hoffman, Jr. |
| 5,271,518 A | 12/1993 | Webb |
| 5,273,174 A | 12/1993 | Fisher |
| D348,219 S | 6/1994 | Goldberg |
| D350,046 S | 8/1994 | Zimmerman |
| 5,377,860 A | 1/1995 | Littlejohn et al. |
| 5,411,140 A * | 5/1995 | Byer ............... B65D 21/0202 206/459.5 |
| 5,423,477 A | 6/1995 | Valdman et al. |
| D361,594 S | 8/1995 | Sails |
| 5,472,139 A | 12/1995 | Valdman et al. |
| 5,518,133 A | 5/1996 | Hayes et al. |
| D371,511 S | 7/1996 | Giarracca |
| D373,704 S | 9/1996 | Doxey |
| 5,732,610 A | 3/1998 | Halladay et al. |
| D393,801 S | 4/1998 | Hayes et al. |
| D394,005 S | 5/1998 | Marijnissen |
| D395,599 S | 6/1998 | Wyslotsky |
| D398,846 S | 9/1998 | Wyslotsky |
| D398,847 S | 9/1998 | Wyslotsky et al. |
| D398,848 S | 9/1998 | Wyslotsky |
| D400,394 S | 11/1998 | Banach et al. |
| 5,873,294 A | 2/1999 | Scuito |
| 5,878,904 A | 3/1999 | Schweigert |
| D415,652 S | 10/1999 | Loew et al. |
| 5,997,924 A | 12/1999 | Olander, Jr. et al. |
| D433,334 S | 11/2000 | Hayes et al. |
| D438,466 S | 3/2001 | Fletcher et al. |
| D440,490 S | 4/2001 | Lizzio |
| 6,257,434 B1 | 7/2001 | Lizzio |
| D473,791 S | 4/2003 | Loris |
| 6,568,586 B1 | 5/2003 | VanEsley et al. |
| 6,601,758 B2 | 8/2003 | Lizzio |
| 6,627,862 B1 | 9/2003 | Pedersen |
| D482,283 S | 11/2003 | Wichmann et al. |
| D484,412 S | 12/2003 | Willis |
| D484,749 S | 1/2004 | Garraway |
| D502,050 S | 2/2005 | Munson et al. |
| 6,858,243 B2 | 2/2005 | Blanchet et al. |
| 6,886,704 B2 * | 5/2005 | Hayes ............... B65D 1/34 206/508 |
| D507,078 S | 7/2005 | Greenfiled |
| 6,957,111 B2 | 10/2005 | Zhu et al. |
| D511,096 S | 11/2005 | Demaggio |
| D524,662 S | 7/2006 | Fager et al. |
| D532,689 S | 11/2006 | Rotta |
| D535,143 S | 1/2007 | Kortleven |
| D546,128 S | 7/2007 | Carlson |
| D547,602 S | 7/2007 | Yamasaki |
| D549,050 S | 8/2007 | Spencer et al. |
| D556,567 S | 12/2007 | Templeton |
| D562,135 S | 2/2008 | Studee |
| D563,785 S | 3/2008 | Maki et al. |
| D573,466 S | 7/2008 | White et al. |
| 7,505,929 B2 | 3/2009 | Angert et al. |
| D598,714 S | 8/2009 | Aagaard |
| 7,678,036 B1 | 3/2010 | Malitas et al. |
| D618,562 S | 6/2010 | Bizzell |
| D620,765 S | 8/2010 | Sudia |
| D620,766 S | 8/2010 | Sudia |
| D621,650 S | 8/2010 | DeLeo |
| 7,778,773 B2 | 8/2010 | Yaqub et al. |
| 7,884,306 B2 | 2/2011 | Leach |
| 7,900,793 B2 | 3/2011 | Hanson et al. |
| D641,233 S | 7/2011 | Pugh |
| 7,984,667 B2 | 7/2011 | Freudinger |
| D645,711 S | 9/2011 | Sudia |
| D653,906 S | 2/2012 | Bull et al. |
| D653,907 S | 2/2012 | Backaert et al. |
| 8,343,560 B2 | 1/2013 | Blythe et al. |
| 8,549,432 B2 | 1/2013 | Warner |
| 8,430,262 B2 | 4/2013 | Corbett et al. |
| D684,046 S | 6/2013 | Meyer |
| D684,462 S | 6/2013 | Hite |
| 8,561,823 B1 | 10/2013 | Krupa |
| D696,066 S | 12/2013 | Parikh |
| D699,106 S | 2/2014 | Glaser et al. |
| D701,567 S | 3/2014 | Abdullah |
| 8,663,419 B2 | 3/2014 | Corbett et al. |
| 8,807,377 B2 | 8/2014 | Corbett et al. |
| 8,858,858 B2 | 10/2014 | Middleton et al. |
| D720,227 S | 12/2014 | Corbett et al. |
| 8,991,635 B2 | 3/2015 | Myerscough |
| 9,005,348 B2 | 4/2015 | Ott |
| 9,010,621 B2 | 4/2015 | Baker et al. |
| 9,073,666 B2 | 7/2015 | Petlak et al. |
| 9,114,916 B2 | 8/2015 | Knipe |
| 9,126,717 B2 | 9/2015 | Myerscough |

(56) References Cited

U.S. PATENT DOCUMENTS

| | | |
|---|---|---|
| 9,126,719 B2 | 9/2015 | Corbett et al. |
| D747,221 S | 1/2016 | Changpan |
| D748,329 S | 1/2016 | Bagai et al. |
| D749,906 S | 2/2016 | Lee |
| 9,292,889 B2 | 3/2016 | Garden |
| D761,103 S | 7/2016 | Lebon |
| 9,387,786 B2 | 7/2016 | Weiner et al. |
| 9,446,889 B2 | 9/2016 | Lopes et al. |
| D769,051 S | 10/2016 | Lee |
| D769,057 S | 10/2016 | Lee |
| D769,058 S | 10/2016 | Lee |
| 9,504,340 B2 | 11/2016 | Starr |
| D774,900 S | 12/2016 | Longoni et al. |
| 9,522,761 B2 | 12/2016 | Baker et al. |
| D775,500 S | 1/2017 | Hogeback |
| D795,069 S | 8/2017 | Haddad |
| D795,070 S | 8/2017 | Haddad |
| 9,730,555 B1 | 8/2017 | Lee |
| D801,176 S | 10/2017 | Lynd et al. |
| 9,815,191 B2 | 11/2017 | Oleynik |
| D804,322 S | 12/2017 | Fox et al. |
| D804,962 S | 12/2017 | Fox et al. |
| D806,575 S | 1/2018 | Collins et al. |
| D811,214 S | 2/2018 | Wu |
| D827,452 S | 9/2018 | Collins et al. |
| D828,161 S | 9/2018 | Collins et al. |
| D829,512 S | 10/2018 | Masanek, Jr. |
| D833,204 S | 11/2018 | Lee |
| 10,213,048 B2 | 2/2019 | Lee |
| D843,207 S | 3/2019 | Das et al. |
| D859,936 S | 9/2019 | Buck |
| D861,422 S | 10/2019 | Collins |
| D866,249 S | 11/2019 | Chiang |
| D872,599 S | 1/2020 | Krueger |
| D884,486 S | 5/2020 | Chiang |
| 10,654,640 B2 | 5/2020 | Chiang |
| 2002/0040862 A1 | 4/2002 | Lizzio |
| 2002/0048624 A1 | 4/2002 | Blanchet et al. |
| 2002/0148845 A1 | 10/2002 | Zettle et al. |
| 2003/0037681 A1 | 2/2003 | Zhu et al. |
| 2005/0109653 A1 | 5/2005 | Wnek et al. |
| 2005/0189350 A1 | 9/2005 | Hayes et al. |
| 2005/0193901 A1 | 9/2005 | Buehler |
| 2006/0175223 A1 | 8/2006 | Casanovas |
| 2006/0213916 A1 | 9/2006 | Brown et al. |
| 2006/0226669 A1 | 10/2006 | Tong et al. |
| 2007/0241110 A1 | 10/2007 | Belleggia |
| 2007/0295631 A1 | 12/2007 | Lin |
| 2008/0023459 A1 | 1/2008 | Leach |
| 2008/0128313 A1 | 6/2008 | Anderson |
| 2008/0275643 A1 | 11/2008 | Yaqub et al. |
| 2009/0048890 A1 | 2/2009 | Burgh |
| 2009/0057381 A1 | 3/2009 | Gokhale |
| 2010/0065562 A1 | 3/2010 | Vovan |
| 2010/0122930 A1 | 5/2010 | Manca |
| 2010/0170899 A1 | 7/2010 | Mithal et al. |
| 2010/0200591 A1 | 8/2010 | Myerscough |
| 2011/0036846 A1 | 2/2011 | Corbett et al. |
| 2011/0086141 A1 | 4/2011 | Strilich et al. |
| 2011/0220652 A1 | 9/2011 | Corbett et al. |
| 2012/0006842 A1 | 1/2012 | Overgaag |
| 2012/0024859 A1 | 2/2012 | Longoni |
| 2012/0024897 A1 | 2/2012 | Corbett et al. |
| 2012/0031901 A1 | 2/2012 | Dudson et al. |
| 2012/0175367 A1 | 7/2012 | Lopes et al. |
| 2012/0234717 A1 | 9/2012 | Kirkland et al. |
| 2013/0313257 A1 | 11/2013 | Gartz et al. |
| 2014/0370167 A1 | 12/2014 | Garden |
| 2015/0068945 A1 | 3/2015 | Baker et al. |
| 2015/0068946 A1 | 3/2015 | Baker et al. |
| 2015/0109653 A1 | 4/2015 | Greer et al. |
| 2015/0290795 A1 | 10/2015 | Oleynik |
| 2015/0343933 A1 | 12/2015 | Weiner et al. |
| 2016/0162833 A1 | 6/2016 | Garden |
| 2016/0214778 A1 | 7/2016 | Goodsell et al. |
| 2017/0275077 A1 | 9/2017 | Chiang et al. |
| 2018/0022523 A1 | 1/2018 | Noferi et al. |
| 2018/0029764 A1 | 2/2018 | Chung et al. |
| 2018/0071939 A1 | 3/2018 | Garden et al. |
| 2018/0105344 A1 | 4/2018 | Chiang et al. |
| 2018/0121037 A1 | 5/2018 | Wajda et al. |
| 2019/0009968 A1 | 1/2019 | Chiang |
| 2019/0218711 A1 | 7/2019 | Chung et al. |
| 2019/0300263 A1 | 10/2019 | Chiang |
| 2019/0315564 A1 | 10/2019 | Chung et al. |
| 2020/0024806 A1 | 1/2020 | Chung et al. |

FOREIGN PATENT DOCUMENTS

| | | |
|---|---|---|
| CN | 301396948 S | 12/2010 |
| EP | 0989067 | 3/2000 |
| EP | 2 230 184 A1 | 9/2010 |
| EP | 2 243 723 A1 | 10/2010 |
| EP | 3006370 | 7/2018 |
| JP | 07-002285 U | 1/1995 |
| JP | 2002-347944 A | 12/2002 |
| JP | 5244344 B2 | 7/2013 |
| KR | 20-0360448 | 8/2004 |
| KR | 10-2009-0098949 A | 9/2009 |
| KR | 10-2015-0121771 | 10/2015 |
| KR | 30-0990068 | 1/2019 |
| WO | 2012/005683 A1 | 1/2012 |
| WO | 2015/006649 | 1/2015 |

OTHER PUBLICATIONS

Advisory Action, dated Jul. 29, 2015, for U.S. Appl. No. 13/920,998, Garden, "Systems and Methods of Preparing Food Products," 3 pages.

Garden, "Systems and Methods of Preparing Food Products," Amendment, filed Apr. 2, 2015, for U.S. Appl. No. 13/920,998, 23 pages.

Garden, "Systems and Methods of Preparing Food Products," Response Under 37 CFR 1.116, filed Aug. 10, 2015, for U.S. Appl. No. 13/920,998, 29 pages.

Garden, "Systems and Methods of Preparing Food Products," Response Under 37 CFR 1.116, filed Jul. 22, 2015, for U.S. Appl. No. 13/920,998, 29 pages.

Garden, "Systems and Methods of Preparing Food Products," Submission for RCE Pursuant to 37 CFR 1.114, filed Sep. 25, 2015, for U.S. Appl. No. 13/920,998, 29 pages.

Garden, "Systems and Methods of Preparing Food Products," U.S. Appl. No. 15/040,866, filed Feb. 10, 2016, 71 pages.

Gardner, "Systems and Methods of Preparing Food Products," Response to Restriction Requirement, filed Oct. 24, 2014, for U.S. Appl. No. 13/920,998, 3 pages.

International Search Report, dated Oct. 22, 2014, for International Application No. PCT/US2014/042879, 3 pages.

International Search Report and Written Opinion of the International Searching Authority, dated Jun. 26, 2017, for International Application No. PCT/US2017/023408, 17 pages.

Notice of Allowance, dated Jan. 7, 2016, for U.S. Appl. No. 13/920,998, Garden, "Systems and Methods of Preparing Food Products," 9 pages.

Office Action, dated Mar. 16, 2015, for U.S. Appl. No. 13/920,998, Garden, "Systems and Methods of Preparing Food Products," 28 pages.

Office Action, dated May 27, 2015, for U.S. Appl. No. 13/920,998, Garden, "Systems and Methods of Preparing Food Products," 31 pages.

Restriction Requirement, mailed Sep. 10, 2014, for U.S. Appl. No. 13/920,998, Gardner, "Systems and Methods of Preparing Food Products," 5 pages.

Written Opinion of the International Searching Authority, dated Oct. 22, 2014, for International Application No. PCT/US2014/042879, 8 pages.

Notice of Allowance, dated Jun. 6, 2018, for U.S. Appl. No. 29/618,670, Collins et al., "Food Container," 2 pages.

(56) References Cited

OTHER PUBLICATIONS

Notice of Allowance, dated May 31, 2018, for U.S. Appl. No. 29/574,805, Collins et al., "Food Container Cover," 2 pages.
Core77 "Notable Packaging Award : Core77 Design Awards 2017, Zume Pizza 'Pizza Pod'" May 14, 2017, https://web.archive.org/web/20170614144555/http://designawards.core77.com/Packaging/62804/Zume-Pizza-Pod, downloaded on Mar. 26, 2018, 4 pages.
DuPont, "Compostable "Pizza Pod" (Zume Pizza, USA)—Diamond Finalist Award," May 22, 2017, http://www.dupont.com/industries/packaging-and-printing/media/press-kits/2017-packaging-awards/mc-image-detail/compostable-pizza-pod.html downloaded on Apr. 20, 2018, 1 page.
Entis et al., "This Robot-Made Pizza Is Baked in the Van on the Way to Your Door," Sep. 29, 2016, http://fortune.com/2016/09/29/this-robot-made-pizza-is-baked-in-the-van-on-the-way-to-your-front-door/ downloaded on Apr. 20, 2018, 1 page.
Farkya, "Compostable Pizza Pod," Nov. 14, 2016, http://www.packagingconnections.com/news/compostable-pizza-pod.htm downloaded on Apr. 20, 2018, 7 pages.
Molina, "Yes, Apple really did patent its own pizza box," May 17, 2017, https://www.usatoday.com/story/tech/talkingtech/2017/05/17/apple-patented-its-own-pizza-box/327267001/ downloaded on Apr. 20, 2018, 2 pages.
Notice of Allowance, dated Apr. 25, 2018, for U.S. Appl. No. 29/618,670, Collins et al., "Food Container," 7 pages.
Notice of Allowance, dated May 9, 2018, for U.S. Appl. No. 29/574,805, Collins et al., "Food Container and Cover," 10 pages.
PW Staff, "Humanitarian initiative wins top DuPont Award," Jul. 5, 2017, https://www.packworld.com/article/trends-and-issues/global/humanitarian-initiative-wins-top-dupont-award downloaded on Apr. 20, 2018, 12 pages.
Requirement for Restriction, dated Apr. 27, 2018, for U.S. Appl. No. 29/558,874, Chiang et al., "Food Container," 7 pages.
Robinson, "This robot-made pizza in Silicon Valley should terrify Domino's and Pizza Hut," Sep. 29, 2016, https://sg.finance.yahoo.com/news/robot-made-pizza-silicon-valley-163400825.html?guccounter=1 downloaded on Apr. 20, 2018, 12 pages.
Wiener, "Food Movers: the Secret Evolution of the Pizza Box," Feb. 2016, https://www.foodandcity.org/evolution-pizza-box/ downloaded on Apr. 20, 2018, 14 pages.
Zume Pizza Homepage, https://zumepizza.com/ downloaded on Apr. 20, 2018, 7 pages.
Office Action dated Aug. 28, 2018 issued in U.S. Appl. No. 15/845,916.
Search Report and Written Opinion dated Nov. 16, 2018 issued in International Patent Application No. PCT/US2018/040749.
Office Action dated Dec. 20, 2018 issued in U.S. Appl. No. 15/465,228.
Notice of Allowance dated Feb. 13, 2019 issued in U.S. Appl. No. 29/558,874.
U.S. Appl. No. 29/656,406, Notice of Allowance dated Jun. 20, 2019, 12 pages.
U.S. Appl. No. 29/574,808, Notice of Allowance dated Jun. 10, 2019, 10 pages.
U.S. Appl. No. 29/558,872, Notice of Allowance dated Jun. 26, 2019, 14 pages.
U.S. Appl. No. 29/558,873, Notice of Allowance dated Jun. 26, 2019, 11 pages.
Casper W. Chang et al., "Container for Transport and Storage of Food Products," U.S. Appl. No. 62/311,787, filed Mar. 22, 2016, 50 pages.
Divya, "Sealed Air and Kuraray to Invest in Capacity at Simpsonville Facility to Produce Plant-Based Food Packaging", Mar. 22, 2019, located online on May 8, 2019 at: https://packaging360.in/news/sealed-air-invests-in-to-simpsonville-facility-to-produce-pla . . . , 7 pages.
Notice of Allowance, dated Jul. 24, 2018, for U.S. Appl. No. 29/618,670, Collins et al., "Food Container," 2 pages.
PCT International Search Report and Written Opinion in International Application PCT/US2018/040730, dated Nov. 14, 2018, 22 pages.
U.S. Appl. No. 15/465,228, Amendment and Response filed Apr. 18, 2019, 16 pages.
U.S. Appl. No. 15/845,916, Amendment and Response filed Dec. 28, 2018, 17 pages.
U.S. Appl. No. 15/845,916, Office Action dated Apr. 8, 2019, 25 pages.
U.S. Appl. No. 29/558,872, Amendment and Response filed Feb. 1, 2019, 23 pages.
U.S. Appl. No. 29/558,872, Office Action dated Nov. 1, 2018, 15 pages.
U.S. Appl. No. 29/558,872, Response to Restriction Requirement filed Aug. 16, 2018, 7 pages.
U.S. Appl. No. 29/558,872, Restriction Requirement dated May 17, 2018, 12 pages.
U.S. Appl. No. 29/558,873, Ex Parte Quayle Action mailed Sep. 6, 2018, 9 pages.
U.S. Appl. No. 29/558,873, Notice of Allowance dated Feb. 8, 2019, 9 pages.
U.S. Appl. No. 29/558,873, Response filed Nov. 6, 2018, 18 pages.
U.S. Appl. No. 29/558,873, Response to Restriction Requirement filed Jul. 17, 2018, 16 pages.
U.S. Appl. No. 29/558,873, Restriction Requirement dated May 17, 2018, 9 pages.
U.S. Appl. No. 29/558,874, Ex Parte Quayle Action mailed Sep. 6, 2018, 10 pages.
U.S. Appl. No. 29/558,874, Notice of Allowance dated Feb. 13, 2019, 10 pages.
U.S. Appl. No. 29/574,802, Amendment and Response filed Aug. 3, 2017, 7 pages.
U.S. Appl. No. 29/574,802, Notice of Allowance dated Aug. 25, 2017, 5 pages.
U.S. Appl. No. 29/574,802, Office Action dated Jun. 1, 2017, 9 pages.
U.S. Appl. No. 29/574,805, Notice of Allowance dated Jul. 23, 2018, 2 pages.
U.S. Appl. No. 29/574,808, Amendment and Response filed Dec. 21, 2018, 15 pages.
U.S. Appl. No. 29/574,808, Office Action dated Sep. 21, 2018, 11 pages.
U.S. Appl. No. 29/574,808, Response to Restriction Requirement filed Aug. 1, 2018, 1 page.
U.S. Appl. No. 29/574,808, Restriction Requirement dated Jun. 1, 2018, 9 pages.
World Centric website, "New PizzaRound from World Centric: The Pizza Box Comes Full Circle", Petaluma, CA, USA, published Mar. 15, 2018, 2 pages, located online on May 2, 2019 at: http://www.worldcentric.org/node/442.
European Search Report in Application 17770987.0, dated Feb. 12, 2019, 8 pages.
U.S. Appl. No. 29/558,872, Notice of Allowance dated May 10, 2019, 9 pages.
U.S. Appl. No. 29/574,808, Notice of Allowance dated May 13, 2019, 5 pages.
Kelley, Mary K., "Caffeine Fix: The Design of Coffee Cup Lids", from Mary Kate's Experience with Human Factors, found online at: https://sites.tufts.edu/mkelleyhfintro/2018/04/12/caffeine-fix-the-design-of-coffee-cup-lids/, Apr. 12, 2018, 8 pages.
U.S. Appl. No. 29/558,872, Ex-Parte Quayle Action mailed Nov. 18, 2019, 10 pages.
U.S. Appl. No. 29/656,406, Notice of Allowance dated Aug. 6, 2019, 2 pages.
U.S. Appl. No. 15/845,916, Office Action dated Aug. 14, 2019, 23 pages.
U.S. Appl. No. 15/465,228, Office Action dated Jul. 18, 2019, 26 pages.
U.S. Appl. No. 16/029,047, Office Action dated Aug. 7, 2019, 6 pages.
PCT International Preliminary Report on Patentability in Application PCT/US2018/040749, dated Jan. 16, 2020, 20 pages.

(56) References Cited

OTHER PUBLICATIONS

U.S. Appl. No. 16/029,047, Notice of Allowance dated Jan. 13, 2020, 7 pages.
U.S. Appl. No. 29/656,406, Notice of Allowance dated Jan. 23, 2020, 10 pages.
U.S. Appl. No. 29/698,689, Office Action dated Oct. 24, 2019, 12 pages.
U.S. Appl. No. 15/465,228, Office Action dated Feb. 26, 2020, 27 pages.
U.S. Appl. No. 29/558,874, Ex Parte Quayle Action mailed Feb. 27, 2020, 11 pages.
U.S. Appl. No. 16/029,047, Notice of Allowance dated Mar. 11, 2020, 2 pages.
U.S. Appl. No. 29/656,406, Notice of Allowance dated Mar. 25, 2020, 2 pages.
U.S. Appl. No. 29/700,713, Notice of Allowance dated Apr. 8, 2020, 8 pages.
U.S. Appl. No. 29/558,872, Notice of Allowance dated Mar. 27, 2020, 7 pages.
U.S. Appl. No. 29/698,689, Noticce of Allowance dated Apr. 6, 2020, 5 pages.
U.S. Appl. No. 15/845,916, Office Action dated Apr. 13, 2020, 22 pages.
U.S. Appl. No. 16/029,047, Notice of Allowance dated Apr. 3, 2020, 2 pages.
U.S. Appl. No. 29/558,874, Notice of Allowance dated Jun. 2, 2020, 7 pages.

* cited by examiner

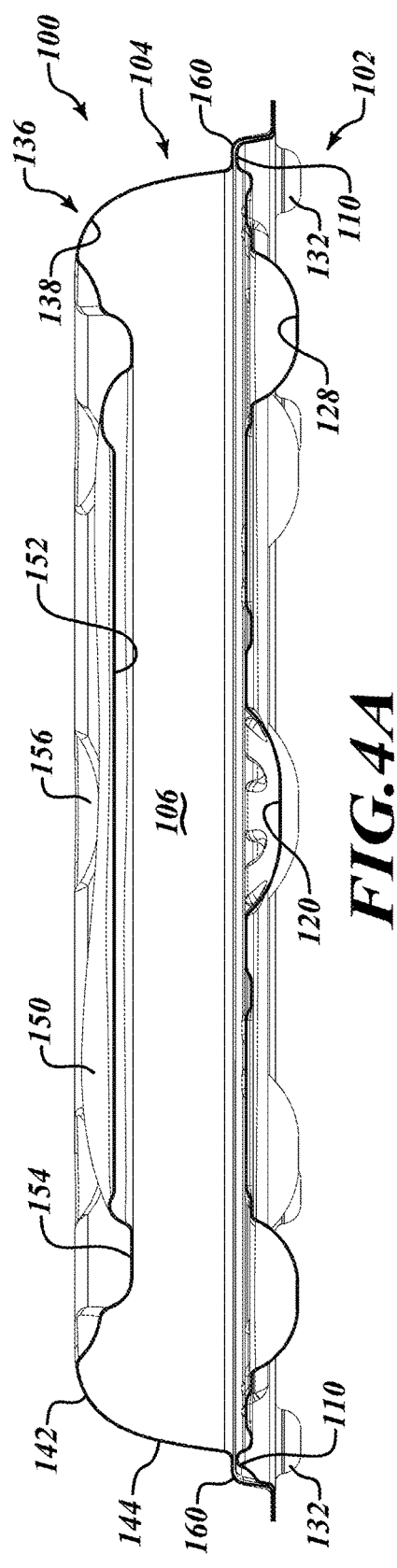
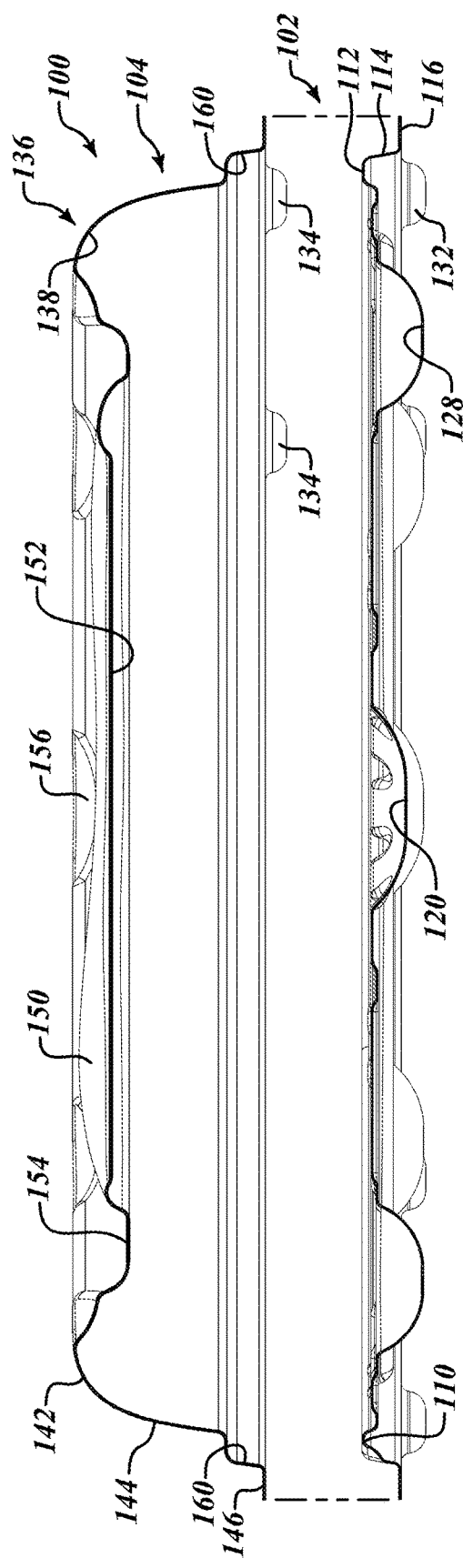
FIG.4A
FIG.4B

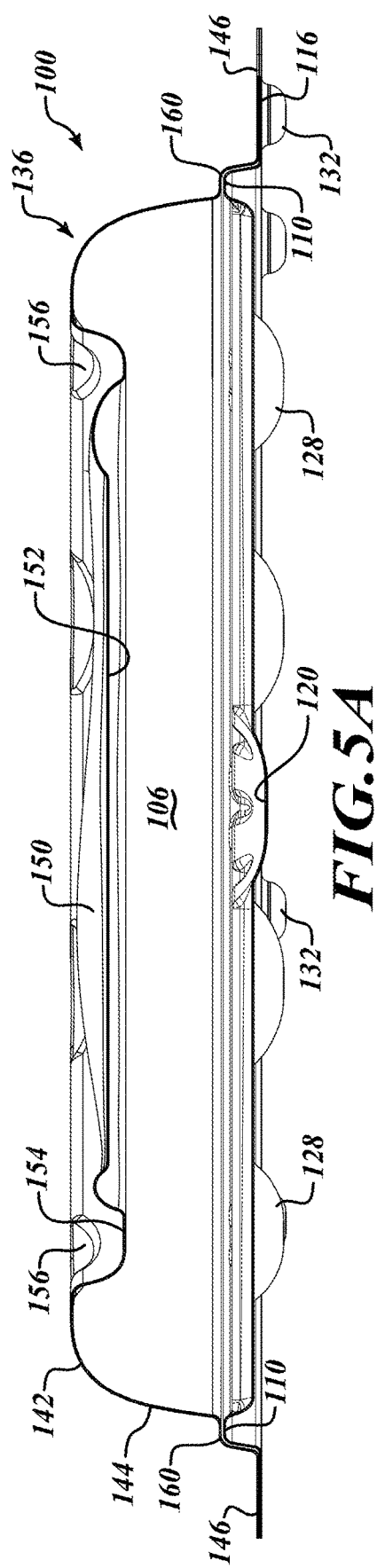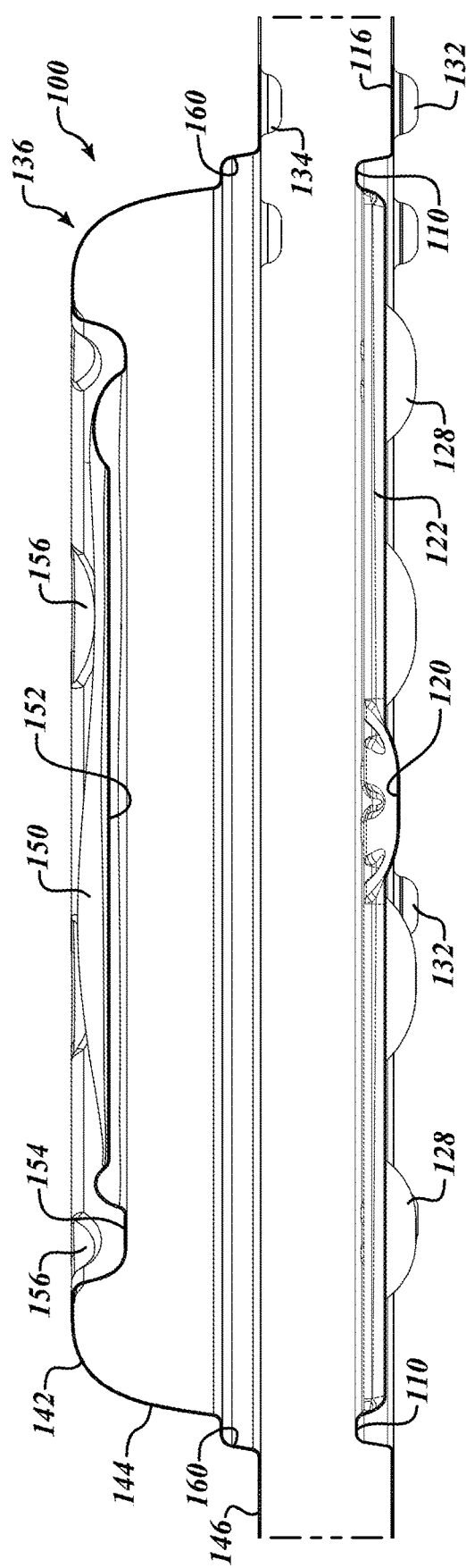

CONTAINER FOR TRANSPORT AND STORAGE OF FOOD PRODUCTS

CROSS-REFERENCE TO RELATED APPLICATIONS

This application is a continuation application of U.S. patent Ser. No. 15/845,916, filed on Dec. 18, 2017, which is a continuation application of U.S. patent Ser. No. 15/465,228, filed Mar. 21, 2017, which claims priority to U.S. Provisional application Ser. No. 62/311,787, filed Mar. 22, 2016.

TECHNICAL FIELD

The present disclosure generally relates to containers for protecting, insulating, transporting and/or cooking food products.

BACKGROUND

Description of the Related Art

Today, the standard pizza box is a square box that is made from a single folded blank of corrugated cardboard. Once folded, the cardboard forms a box that is normally about two inches high and having equal sides of between 12 inches and 18 inches. The corrugated cardboard used to produce the pizza box is typically thick, which provides the pizza box with structural strength needed to stack multiple filled pizza boxes atop one another without the bottom box collapsing. Even then, stacking two or more pizza boxes together typically requires the ubiquitous pedestals or "pizza savers" which are placed within the box at the approximate center thereof to prevent the top or lid of the pizza box from being forced into contact with the pizza inside the box due to forces of one or more pizza boxes stacked on top of the pizza box. An example of such pizza saver is shown in U.S. Pat. No. 4,498,586.

In a traditional pizza box, the inside bottom surface of the pizza box is flat and smooth. When a pizza is placed inside the box, the bottom of the pizza rests flush against the flat bottom of the box. Consequently, any condensation, grease, or other liquid that collects between the bottom of the pizza and the bottom of the box becomes trapped. This can cause the bottom of a pizza to become soggy or oily, and can also reduce the structural integrity of the pizza box. Additionally, the top of the pizza box absorbs moisture emanating from hot, steaming pizza, which causes the top portion to droop, and which may cause the pizza box to collapse or may at least cause the top portion of the pizza box to touch the top of the pizza in instances where the aforementioned "pizza saver" is not used.

BRIEF SUMMARY

A compostable fiber food container may be summarized as including: a base including at least a portion of a raised rim disposed about a perimeter of an upwardly facing food receiving portion which receives a food product, the food receiving portion including an inner surface and a plurality of wells disposed in the food receiving portion that extend downwardly from the inner surface and which project outwardly from a bottom face of the base as a number of feet; and a compostable fiber cover selectively engageable with the base, the cover including a central dome portion having a substantially downward facing interior surface and a substantially upward facing exterior surface, the interior surface of the central dome portion having at least a portion of a channel disposed about a perimeter of the central dome that are sized and dimensioned to engage the at least a portion of the raised rim of the base when the cover is engaged with the base, and the central dome portion sized and shaped to provide an interior chamber which protects the food product, and the exterior surface of the central dome portion includes a plurality of dome recesses, at least some of the plurality of dome recesses sized and dimensioned to receive at least a portion of respective ones of the feet of a base of another food container identical to the food container when the other food container is stacked on top of the cover of the food container.

The base may include a number N of wells, the cover may include the number N of dome recesses, and each of the dome recesses may be vertically aligned with one of the wells when the cover is engaged with the base. The base may include eight wells and the cover may include eight dome recesses, each of the dome recesses may be vertically aligned with one of the wells when the cover is engaged with the base. The central dome portion may include a raised outer rim spaced radially outward from a center of the central dome portion, and each of the dome recesses may be disposed on the outer rim of the central dome portion. At least a portion of each of the dome recesses may be disposed inward of an apex of the outer rim. The central dome portion may include a raised inner rim spaced radially outward from the center of the dome portion and spaced radially inward from the raised outer rim. Each well may have a rim adjacent the planar surface which may have an oval profile. Each of the wells and each of the dome recesses may be sized and dimensioned to restrict at least one of lateral movement or rotational movement between the cover of the food container and a base of another food container when the other food container is stacked on the cover of the food container. The base may include a plurality of sector portions, in which each sector portion may include a plurality of raised sector ribs extending upwardly from the planar surface. Each of a plurality of features including the raised rim, the wells, the channels, and the raised sector ribs may be spaced apart from at least one other of the plurality of features by a distance which is less than or equal to one inch. The base may have an overall height which is less than or equal to 1.5 inches. Each of the base and the cover may be formed from a single layer of material having a thickness in the range of 0.5 millimeters to 1.0 millimeters. The food receiving portion of the base may not have a continuously planar surface which exceeds 2 inches by 2 inches. Each of the base and the cover may have a length dimension which is greater than or equal to 12 inches. Each of the base and the cover may be formed from one of sugarcane fiber, wood fiber, or bamboo fiber. The base may have a square perimeter with rounded edges, and the food receiving portion may have a perimeter having a circular profile. The cover may have at least one denesting lug which provides a space between at least a portion of the cover and at least a portion of another cover when the cover is stacked together with the other cover. The raised rim of the base may include a plurality of cover interface portions that extend radially outward from the remainder of the raised rim, and the perimeter channel of the cover may be sized and dimensioned to engage each of the plurality of cover interface portions of the base when the cover is engaged with the base to provide an interference fit between the cover and the base.

A food container may include: a base of molded compostable fiber, the base including one or more protrusions disposed about a perimeter of an upwardly facing food receiving portion which receives a food product, the base having a bottom face, and the food receiving portion including an inner surface with a plurality of wells that project outwardly as respective mateable stacking feet from the bottom face of the base; and a cover of molded compostable fiber, the cover selectively engageable with the base, the cover having a substantially downward facing interior surface and a substantially upward facing exterior surface, the interior surface of the cover having one or more depressions disposed about a perimeter of the cover that are sized and dimensioned to engage the at least a portion of the one or more protrusions of the base when the cover is engaged with the base, and the cover sized and shaped to provide an interior chamber which protects the food product, and the exterior surface of the cover includes a plurality of recesses, at least some of the plurality of recesses sized and dimensioned to receive at least a portion of respective ones of the mateable stacking feet of a base of another food container identical to the food container when the other food container is stacked on top of the cover of the food container.

The base may have a rectangular-shaped outer perimeter with rounded corners, the outer perimeter defined by first and second parallel edges and third and fourth parallel edges, and each of the channels are non-parallel with each of the first, second, third, and fourth edges of the base. The base may include a plurality of sector portions in the food receiving portion, in which each sector portion of the food receiving portion may include one of the plurality of wells that extends downwardly from the planar surface. Each well may have a rim adjacent the planar surface which has a profile in the shape of at least one of an oval, a circle, a triangle, a square, or a symbol. Each sector portion may include a raised sector portion rim which extends upward from the planar surface and is adjacent at least one of the two adjacent channels which delineate the sector portion. At least some of the raised sector ribs in each sector portion may have a length dimension which extends radially with respect to the central well. The base may include a base flange surrounding at least a portion of the raised rim, and the cover may include a cover flange surrounding at least a portion of the central dome portion. The base flange may include at least one base fastening recess which extends downwardly from the base flange, and the cover flange may include at least one corresponding cover fastening protrusion which extends downwardly from the cover flange, the at least one base fastening recess sized and dimensioned to receive at least a portion of the at least one cover fastening protrusion when the cover is engaged with the base. The at least one base fastening recess and the at least one cover fastening protrusion may each be sized and dimensioned to provide an audible cue when the at least one base fastening recess is separated from the cover fastening protrusion. The at least one base fastening recess may have a depth that is greater than 5 millimeters and a diameter that is greater than 8 millimeters, and the at least one cover fastening protrusion may have a depth which is 1 millimeter less than the depth of the at least one base fastening recess, and a diameter which is 1 millimeter greater than the diameter of the at least one base fastening recess. The at least one base fastening recess may include a plurality of recesses each having an upward facing surface and a downward facing surface, the downward facing surface of each of the plurality of base fastening recesses sized and dimensioned to be weight-bearing when the base is disposed on a planar support surface. The base flange may include at least one base fastening protrusion which extends upwardly from the base flange, and the cover flange may include at least one corresponding cover fastening recess which extends upwardly from the cover flange, the at least one cover fastening recess sized and dimensioned to receive at least a portion of the at least one base fastening protrusion when the cover is engaged with the base. When the cover is engaged with the base, a perimeter of the cover flange may be vertically aligned with a perimeter of the base flange. The food container may include a number N of channels which delineate a corresponding number N of sector portions of the food receiving portion, where N is a positive integer. Each of the base and the cover may be formed from a single layer of material. Each of the base and the cover may be formed from one of sugarcane fiber, wood fiber, or bamboo fiber. The food receiving portion may have a circular profile. The base and the cover may each be formed from a single layer of material, and the base and the cover may be sized and dimensioned to be nestable with other bases and covers, respectively. The plurality of channels may be equally radially spaced to enable cutting of the food product into equally sized pieces when a cutting tool moves along the channels.

A food container may be summarized as including: a base including one or more depressions disposed about a perimeter of an upwardly facing food receiving portion which receives a food product, the food receiving portion including an inner surface and a plurality of wells disposed in the food receiving portion that extend downwardly from the inner surface and that project outwardly as respective feet from the bottom face of the base; and a cover selectively engageable with the base, the cover having a substantially downward facing interior surface and a substantially upward facing exterior surface, the interior surface of the cover having one or more protrusions disposed about a perimeter of the cover that are sized and dimensioned to engage the at least a portion of the one or more depressions of the base when the cover is engaged with the base, and the cover sized and shaped to provide an interior chamber which protects the food product, and the exterior surface of the cover includes a plurality of recesses, at least some of the plurality of recesses sized and dimensioned to receive at least a portion of respective ones of the feet of a base of another food container identical to the food container when the other food container is stacked on top of the cover of the food container.

A food container may be summarized as including: a base including one of a raised rim or channel disposed about a perimeter of an upwardly facing food receiving portion which receives a food product, the food receiving portion including an inner surface and a plurality of depressions disposed in the food receiving portion that extend downwardly from the inner surface and that project outwardly as respective mateable stacking feet from the bottom face of the base; and a cover selectively engageable with the base, the cover having a substantially downward facing interior surface and a substantially upward facing exterior surface, the interior surface of the cover having the other of the raised rim or channel disposed about a perimeter of the cover that are sized and dimensioned to engage the one of the raised rim or channel of the base when the cover is engaged with the base, and the cover sized and shaped to provide an interior chamber which protects the food product, and the exterior surface of the cover includes a plurality of recesses, at least some of the plurality of recesses sized and dimensioned to receive at least a portion of respective ones of the mateable stacking feet of a base of another food container identical to the food container when the other food container is stacked on top of the cover of the food container.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4A is a sectional view of the food container taken along the line 4A-4A of FIG. 3, according to one illustrated implementation.

FIG. 4B is a sectional view of the food container taken along the line 4A-4B of FIG. 1B, according to one illustrated implementation.

FIG. 5A is a sectional view of the food container taken along the line 5A-5A of FIG. 3, according to one illustrated implementation.

FIG. 5B is a sectional view of the food container taken along the line 5A-5B of FIG. 1B, according to one illustrated implementation.

DETAILED DESCRIPTION

Figure 1A:
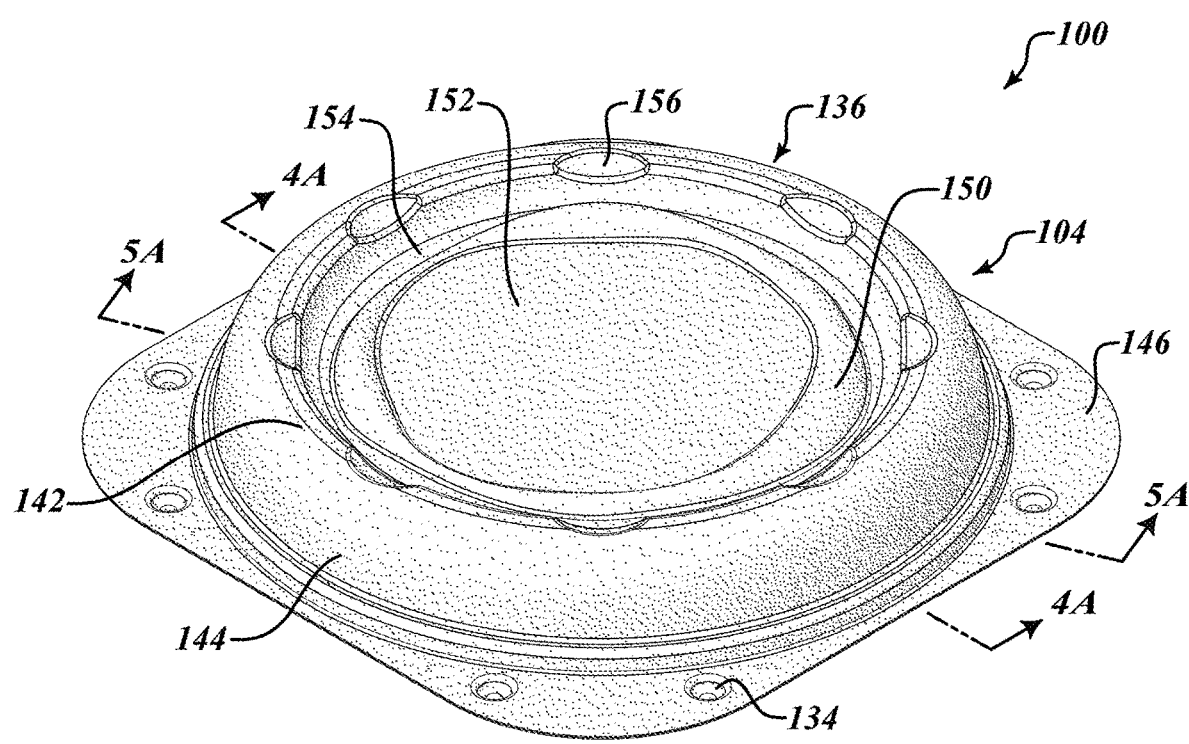
FIG. 1A is a top perspective view of a food container, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to providing food containers which preserve the quality of a food product for a duration of time, and which optionally allow for cooking of the food product therein. In one or more implementations, the food containers discussed herein are structurally sturdy, stackable, thermally insulating, disposable (e.g., compostable) and require minimal or no manual labor to assemble. In some implementations, the food containers discussed herein use a relatively small amount of material compared to existing corrugated cardboard containers, which material is compostable and/or recyclable.

Initially, a first implementations of a food container is discussed with reference to FIGS. 1A-11C and 13. Then, a second implementation of a food container is discussed with reference to FIG. 12. Then, a third implementation of a food container is discussed with reference to FIGS. 14A-21. Features of one or more of the implementations discussed herein may be modified and/or combined to provide further implementations.

Referring to FIG. 1A through FIG. 11C, various views of a food container 100 are shown. The food container 100 is illustrated as a container for containing a pizza for explanatory purposes, but it should be appreciated that the present disclosure is not limited to such. As shown in FIG. 1B, the food container 100 includes a base 102 and a separate cover 104 which cooperate as shown in the figures and described below to form a closed chamber 106 for supporting, protecting, insulating and optionally cooking a food product (e.g., pizza).

In some implementations, the base 102 and cover 104 may each be separately formed of a single layer of liquid-resistant insulating material including, but not limited to, molded sugarcane fiber ("bagasse"), molded wood fiber, molded bamboo fiber, molded paper or plastic (e.g., biodegradable plastic, thermoplastic material, bio-based plastic, recycled plastic, recyclable plastic). The base and/or the cover may be opaque, semi-transparent, or transparent (e.g., an opaque base made with molded fiber and a cover made with transparent plastic material). This is in contrast to conventional pizza boxes which are made from corrugated cardboard. In implementations wherein the base 102 cover 104 are formed from molded fibers, the single layer of material may have a relatively small thickness of between 0.5 mm and 1.0 mm (e.g., 0.8 mm). In implementations wherein the base 102 and cover 104 are formed from plastic (e.g., polyethylene terephthalate (PET), polylactic acid (PLA)), the single layer of material may have a thickness of 0.5-0.6 mm or less.

In some implementations, the base 102 is formed of a single layer of insulating material and includes an upwardly facing circular-shaped food receiving portion 108 which receives the pizza thereon. The base 102 further includes a raised peripheral rim 110 disposed about a perimeter of the food receiving portion 108. The rim 110 comprises a raised upwardly facing apex surface 112 (see FIG. 4B) and an downwardly and outwardly extending sidewall 114 which meets with a substantially planar base flange 116 that extends outwardly from the rim. As shown in FIG. 1B, the base flange 116 has a substantially rectangular-shaped (e.g., square) outer perimeter with rounded corners defined by first and second parallel edges 118A and 118B and third and fourth parallel edges 118C and 118D. Among other things, the base flange 116 strengthens the rigidity of the base 102.

The food receiving portion 108 of the base 102 includes a planar surface 109 and a number of features which extend at least one of upward or downward from the planar surface 109. In particular, the food receiving portion 108 includes a central well 120 which extends downwardly from the planar surface 109 and receives liquid drippings or condensation from the cooked food (e.g., pizza) placed in the food container 100. In the illustrated implementation, the central well 120 has a circular perimeter, but may have other shapes (e.g., triangle, octagon) in other implementations.

The food receiving portion 108 also includes a plurality of food receiving portion channels or grooves 122 (also referred to herein as "channels") extending downwardly below the planar surface 109 and running radially outward from the central well 120 and terminating at the raised peripheral rim 110. In some implementations, the radial channels 122 may extend only partially between the central well 120 and the raised peripheral rim 110. In the illustrated implementation, each of the channels 122 has a U-shaped cross-sectional profile, but in other implementations the channels may have other shapes (e.g., V-shaped). In some implementations, each channel 122 may slope downward from the rim 110 toward the central well 120 to facilitate the flow of liquid through the channel into the central well. Each pair of adjacent channels 122 and a corresponding portion of the raised peripheral rim 110 delineate a respective sector portion 124 of the food receiving portion 108 which supports a portion of a food item (e.g., an individual slice of pizza). In the illustrated implementation, the base 102 includes eight channels 122 and eight sector portions 124. Generally the base 102 may include N channels and N sector portions, where N is a positive integer.

The plurality of channels 122 are equally radially spaced to enable cutting of the food item (e.g., pizza) into equally sized pieces when a cutting tool (e.g., knife) moves along the channels. Since the channels 122 extended downward from the planar surface 109, a user may cut through the food item over the channels without damaging (e.g., cutting) the food receiving portion 108 of the base 102. Further, each of the channels 122 are non-parallel with each of the edges 118A-118D of the base 102, which improves the rigidity of the base. In the illustrated implementation, each of the channels 122 is offset by 22.5° from perpendicular from a respective one of the edges 118A-118D which the channel extends toward. Further, each of the channels 122 is collinear with an opposite channel that extends radially in the opposite direction. Thus, when the base 104 is to be discarded (e.g., composted), the user may fold the base along an axis which extends through two opposing collinear channels to reduce the dimensions of the base so the base will fit within a compost receptacle.

Among other things, the channels 122 function to strengthen the base 102 in rigidity and provide supporting forces to the food receiving portion 108 when the base is disposed on a resting surface, such as a countertop, oven or another food container. The channels 122 also serve as guides for a cutting tool to cut eight equally sized pieces of a food item (e.g., pizza). Further, the channels 122 provide air space below the food item, which provides additional insulation. In some implementations, because the channels 122 may be substantially covered by the food item placed on the food receiving portion 108, indicia (e.g., visible and/or tactile markings) may be positioned on or adjacent the rim 110 radially in line with the channels to aid the user in cutting the pizza into pieces along the channels.

As discussed above, each pair of adjacent channels 122 and a corresponding portion (e.g., a 45° arc portion) of the raised peripheral rim 110 delineate a respective sector portion 124 of the food receiving portion 108 which receives an individual piece of the food item (e.g., slice of pizza). Each sector portion 124 includes a portion of the planar surface 109 and a raised sector portion rim 126 (FIG. 1B) which extends upward from the planar surface and adjacent each of the channels 122 which define the sector portion. In addition to supporting the food item above the planar surface 109, the raised sector portion rim 126 adjacent the channels 122 may aid in supporting the food item near the cutting location, thereby facilitating the cutting process to provide accurate individual pieces.

Each sector portion 124 further includes a sector well 128 which may receive liquid drippings from the food product therein. In the illustrated implementation, each sector well has a perimeter rim adjacent the planar surface 109 which has an oval profile. In other implementations, each of the perimeter rims may have a profile in the shape of at least one of a circle, a triangle, a square, another shape, or a symbol (e.g., logo). Each sector portion 124 also includes a plurality of raised sector ribs or projections 130 which extend upward from the planar surface 109 around the sector well 128 having an uppermost portion which supports the hot food product (e.g., pizza). In some implementations, the combined area of the ribs 130 in a sector portion 124 is smaller than the portion of the planar surface 109 in the sector portion. Thus, when the food product is supported on the uppermost portions of the ribs 130 and the raised sector portion rim 126, heat loss due to conduction through the planar surface 109 is substantially reduced compared to food containers with flat bottom surfaces which have relatively large surface area contact with the bottom surface of the food product. Additionally, the raised ribs 130 and sector portion rim 126 tend to isolate the bottom surface of the food product from the planar surface 109, which prevents the food product from becoming soggy due to trapped liquid on the planar surface 109 of the food receiving portion 108.

In the illustrated implementations, the shapes of the ribs 130 are elongated and have a length dimension which extends radially with respect to the central well 120. Additionally, in the illustrated implementations the ribs 130 are radially symmetrical. In other implementations, the number, sizes and dimensions of the raised ribs 130 may be different from shown in the figures. The raised ribs 130 also function to improve the rigidity of the base 102.

In some implementations, each of a plurality of features of the base 102 comprising the raised rim 110, the central well 120, the sector wells 128, the channels 122, and the raised sector ribs 130 is spaced apart from at least one other of the plurality of features by a distance which is less than or equal to one inch. In some implementations, due to the aforementioned plurality of features, the food receiving portion 108 of the base 102 does not have a continuously planar surface which exceeds 2 inches by 2 inches. Such features significantly improve the strength of the base 102, while allowing the base to have a length dimension greater than 12 inches (e.g., 16 inches), a width dimension greater than 12 inches (e.g., 16 inches), an overall height which is less than 1.5 inches (e.g., 1 inch), and a material thickness between 0.5 mm and 1.0 mm (e.g., 0.8 mm). In other implementations, the base 102 may have a relatively larger height and the cover 104 may have a relatively smaller height.

The base flange 116 which extends around the raised rim 110 includes eight fastening recesses or seats 132 that extend downwardly from the base flange. As discussed below, each of the fastening recesses 132 of the base 102 receive a corresponding one of a plurality of downwardly extending fastening protrusions 134 of the cover 104 to selectively retain the cover on the base 102. The fastening recesses 132 are generally dome-shaped in the illustrated implementations, but may be other shapes and sizes in other implementations. Further, other implementations may include more fastening recesses, fewer fastening recesses, or no fastening recesses.

In some implementations, at least some of the fastening recesses 132, the central well 120, and the sector wells 128 extend downwardly to a lowermost portion of the base 102 so that they are weight-bearing and function as "feet" which form an insulating air space below the food receiving portion 108 of the base 102 and a resting surface when the base is supported on the resting surface. Thus, the raised ribs 130 of each sector portion, together with at least some of the fastening recesses 132, the central well 120, and the sector wells 128, form a layer of air insulation between the planar surface 109 of the food receiving portion 108 and the food product and a layer of air insulation between the food receiving portion and a resting surface using only a single layer of material (i.e., the material which forms the base 102). Additionally, the aforementioned "feet" raise the remainder of the base 102 (and cover 104 when engaged with the base) slightly above a resting surface (e.g., table), which causes a shadow to be cast, similar to a more formal serving plate.

The cover 104 comprises a single layer of thermally insulating material (e.g., molded fiber) and includes a central dome portion 136 comprising a substantially downward facing interior surface 138 (FIG. 2B) and a substantially upward facing exterior surface 140 (FIG. 1B). As shown in FIG. 4B, the dome portion 136 comprises a raised outer rim 142 spaced radially outward from the center of the dome portion which terminates in a downwardly and outwardly extending sidewall 144. The sidewall 144 meets with a substantially planar cover flange 146 which extends laterally outwardly therefrom. Similar to the base flange 116, the cover flange 146 has a substantially rectangular-shaped outer perimeter with rounded corners defined by first and second parallel edges 148A and 148B and third and fourth parallel edges 148C and 148D (see FIG. 1B). Among other things, the cover flange 146 strengthens the rigidity of the cover 104.

The cover flange 146 also includes eight integrally formed fastening protrusions 134 which extend downwardly from the cover flange. The fastening protrusions 134 are generally dome-shaped in the illustrated implementations, but may be other shapes and sizes in other implementations. Further, other implementations may include more fastening protrusions, fewer fastening protrusions, or no fastening protrusions. As shown in FIG. 11C, each of the fastening protrusions 134 of the cover flange 146 is vertically aligned with one of the integrally formed fastening recesses 132 of the base flange 116 to form a fastener 131. In operation, each fastening recess 132 may receive a corresponding fastening protrusion 134 when the cover 104 is placed on the base 102. Among other things, such fasteners 131 may restrict lateral or rotational movement of the cover 104 relative to the base 102 which maintains the alignment of the cover relative to the base. In some implementations, each fastening recess 132 may be sized and dimensioned to receive a corresponding fastening protrusion 134 responsive to an external force pushing the fastening recess and the fastening protrusion together when the cover 104 is placed on the base 102, forming an interference or press fit. In such implementations, upon receiving a fastening protrusion 134, a fastening recess 132 may generate a fastening force which facilitates holding the cover 104 in a closed configuration on the base 102. Such fastening force resists external forces applied to the container 100 so that the container remains closed throughout storage, transportation or any other function of the container.

In some implementations, the base flange 116 may include a number of fastening protrusions that extend upwardly from the base flange, and the cover flange 146 may include a corresponding number of fastening recesses that extend upwardly from the cover flange. In such implementations, the fastening recesses of the cover 104 may receive the fastening protrusions of the base 102.

For a plastic blister or thermoform package, due to its elastic property, when a fastening or positioning mechanism is separated the mechanism will generate an audio cue (e.g., "snap") to signal the movement. This is due to the "undercut" design, which is a commonly known design technique in the plastic packaging industry. Such is feasible because the plastic molding process allows the undercut design. For paper or molded pulp products, it may not be possible make such an undercut design, and therefore it is typically accepted that a molded pulp package cannot have any locking design with an audible snap function. However, in some implementations of the present disclosure, due to the combination of dimension of the interference, the angle, and the thickness of the base 102 and cover 104, the fastening mechanisms provide an unexpected performance with an audible cue (e.g., "snap") when the fastening protrusions are disengaged from the corresponding fastening recesses. In some implementations, this audible cue may be produced more than once (e.g., each time a fastening protrusion is disengaged from a fastening recess). In some implementations, each of the fastening recesses has a depth that is greater than 5 millimeters and a diameter that is greater than 8 millimeters, and each of the fastening protrusions has a depth which is 1 millimeter less than the depth of the fastening recesses, and a diameter which is 1 millimeter greater than the diameter of the fastening recesses.

The dome portion 136 further comprises an irregularly-shaped raised inner rim 150 disposed radially inward of the raised outer rim 142, and a substantially planar ceiling portion 152 disposed inward of the raised inner rim. In some implementations, the raised inner rim 150 has a radially asymmetric profile. A downwardly extending dome portion channel or groove 154 is positioned radially between the raised outer rim 142 and the raised inner rim 150. The shapes and dimensions of the raised outer rim 142, the dome portion channel 154 and the raised inner rim 150 may be different in other implementations. The raised outer rim 142, the dome portion channel 154 and the raised inner rim 150 together provide rigidity to the dome portion 136 which, as discussed below, provides support to the ceiling portion 152 and facilitates stacking of multiple containers 100 together. In the illustrated example, the raised inner rim 150 is lower in height than the raised outer rim 142, but in other implementations the height of the inner rim may be equal to or greater than the outer rim. As discussed further below with reference to FIGS. 11A-11C, the outer rim 142 of the central dome portion 136 also includes eight spaced apart dome recesses 156 each sized and dimensioned to receive at least a portion of a corresponding sector well 128 of a base 102 of another food container 100 when the other food container is stacked on top of the cover 104 of the food container.

Among other things, the shapes of the sidewall 144, raised outer rim 142, dome portion channel 154, and raised inner rim 150 function to improve the rigidity of the cover 104, and serve to distribute supporting forces when an object (e.g., one or more other food containers) is stacked on the cover 104. Further, the shape of the interior surface 138 of the central dome portion 136 and/or the texture (e.g., rough texture) of the interior surface may tend to absorb or retain moisture (e.g., condensation) which reduces the amount of moisture that returns to the hot food item (e.g., pizza) which could cause quality deterioration of the food item. Additionally, the generally round shape of the central dome portion 136 which corresponds to a round food item (e.g., pizza) provides a reduced surface area for heat transfer compared to a conventional square pizza box, thus prolonging the duration that the food item maintains an elevated temperature. In other implementations, the central dome portion 136 may be sized and/or dimensioned differently than shown in the illustrated implementations.

As shown in FIGS. 4A and 4B, the interior surface 138 of the sidewall 144 of the central dome portion 136 has an inwardly and downwardly facing perimeter channel 160 sized and dimensioned to form engage the raised perimeter rim 110 of the base 102 when the cover 104 is engaged with the base. When the cover 104 is engaged with the base 102, the perimeter channel 160 of the sidewall 144 of the cover contacts the top surface 112 and sidewall 114 of the raised rim 110 of the base 102 to form a "seal" which may limit or even prevent the flow of air into or out of the enclosed chamber 106 which houses the food item. In some implementations, the perimeter channel 160 and the raised rim 110 are sized and dimension to form an interference or press fit therebetween when the cover 104 is engaged with the base 102.

The various features of the dome portion 136 provide significant strength which, among other things, allows for stacking multiple food containers 100 together. Specifically, the dome portion 136 includes several curved or cornered portions which together improve the rigidity of the cover 104. For example, the dome portion 136 includes the perimeter channel 160 adjacent the base flange 116, the curved sidewall 144 radially inward of the perimeter channel, the raised outer rim 142 radially inward of the sidewall, the dome portion channel 154 radially inward of the raised outer rim, the raised inner rim 150 radially inward of the dome portion channel, and the planar ceiling portion 152 radially inward of the raised inner rim.

When the cover 104 is engaged with the base 102 (FIG. 4A), the base flange 116 and cover flange 146 are also in contact and fastened by the fasteners 131 which, as noted above, serve to restrict lateral or rotational motion between the cover and the base, to add strength to the assembled food container 100, and to increase the limiting of airflow into the chamber 106. As discussed above, in some implementations the fasteners 131 may form an interference or press fit between each pair of protrusions 134 and recesses 132 of the cover 104 and base 102, respectively. In such implementations, the fasteners 131 also function to retain the cover 104 on the base 102.

In the illustrated implementation, the outer dimensions of the base 102 and the cover 104 are substantially matched which aids the user in aligning the cover 104 when placing the cover onto the base during use, particularly when the cover is not joined to the base via a hinge (e.g., flexible joint). In some implementations, due to various symmetries of the base 102 and the cover 104, the cover may be secured to the base at any of four relative rotational angles (e.g., 0°, 90°, 180°, and 270°) relative to the base. That is, the edge 148A (FIG. 1B) of the cover 104 may be vertically aligned with any of the edges 118A-118D of the base 102. To remove the cover 104 from the base 102, the user may lift the cover relative to the base with sufficient force to overcome the "seal" between the perimeter channel 160 of the cover and the rim 110 of the base and, in implementations where the fasteners 131 are secured by interference or press fits, sufficient force to overcome the fastening forces of the respective fasteners 131.

As shown in FIG. 1B, in some implementations, the raised rim 110 of the base 102 includes one or more grooves or notches 162 at an intersection of the top surface 112 and the sidewall 114 of the rim 110. Such grooves 162 may function to release the seal between the cover 104 and the base 102 when the user begins to lift the cover from the base prior to the perimeter channel 160 disengaging with the remainder of the raised rim 110. Such feature advantageously makes the cover 104 easier to remove from the base 102 when a user desires to access the food item in the food container 100.

The base 102 and cover 104 of the food container 100 may be nestable with other bases and covers, respectively, with a minimum amount of vertical height (i.e., essentially the thickness of the material for each component). That is, when a first base 102 is stacked on top of a second base, the top surfaces of the features of the lower second base are positioned adjacent the bottom surfaces of corresponding features of the upper first base, with minimal air space therebetween. Similarly, when a first cover 104 is stacked on top of a second cover, the top surfaces of the features of the lower second cover are positioned adjacent the bottom surfaces of corresponding features of the upper first cover. Thus, numerous bases may be stacked together at a height which is much less than the combined height of the individual bases. Similarly, numerous covers may be stacked together at a height which is much less than the combined height of the individual covers. Such nesting feature is advantageous for shipping and for storing the food containers 100 in a small space (e.g., restaurant, vehicle, packaging).

Further, unlike conventional pizza boxes formed from a cardboard blank which has to be folded, no pre-assembly is required. Thus, the base 102 and cover 104 need not be handled by a user until selected for use to perform its intended function, which significantly reduces the likelihood of contamination.

Figure 1B:
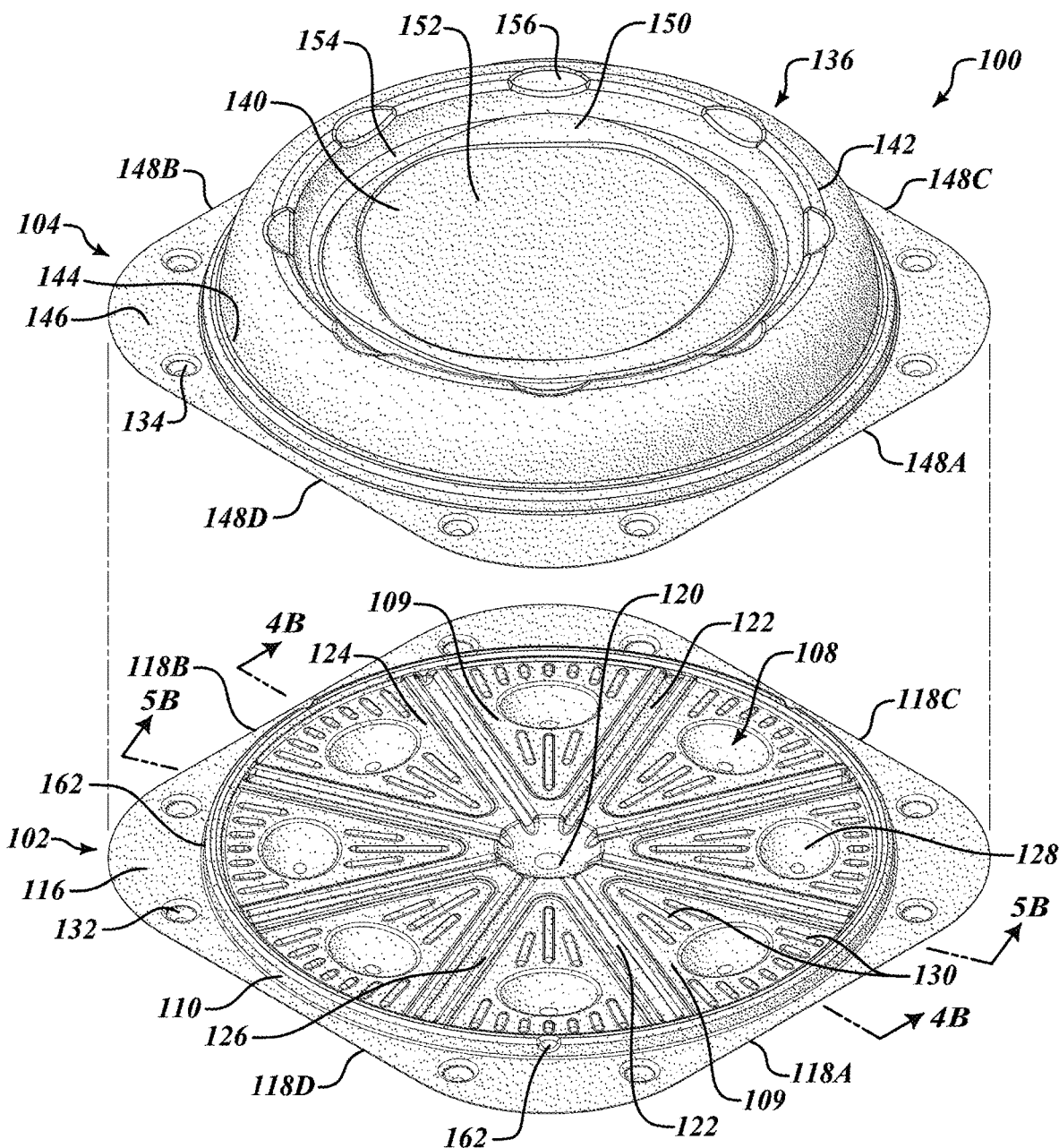
FIG. 1B is a top perspective view of the food container with a cover of the food container separated from a base thereof, according to one illustrated implementation.
Figure 2A:
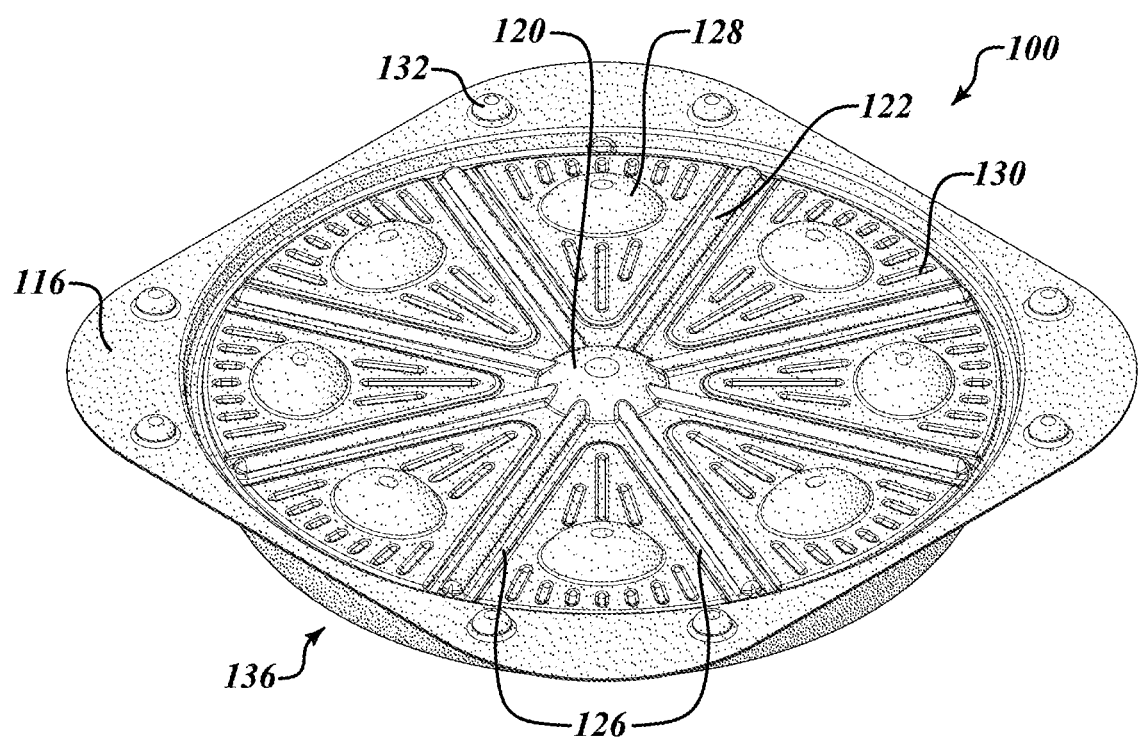
FIG. 2A is a bottom perspective view of the food container, according to one illustrated implementation.
Figure 2B:
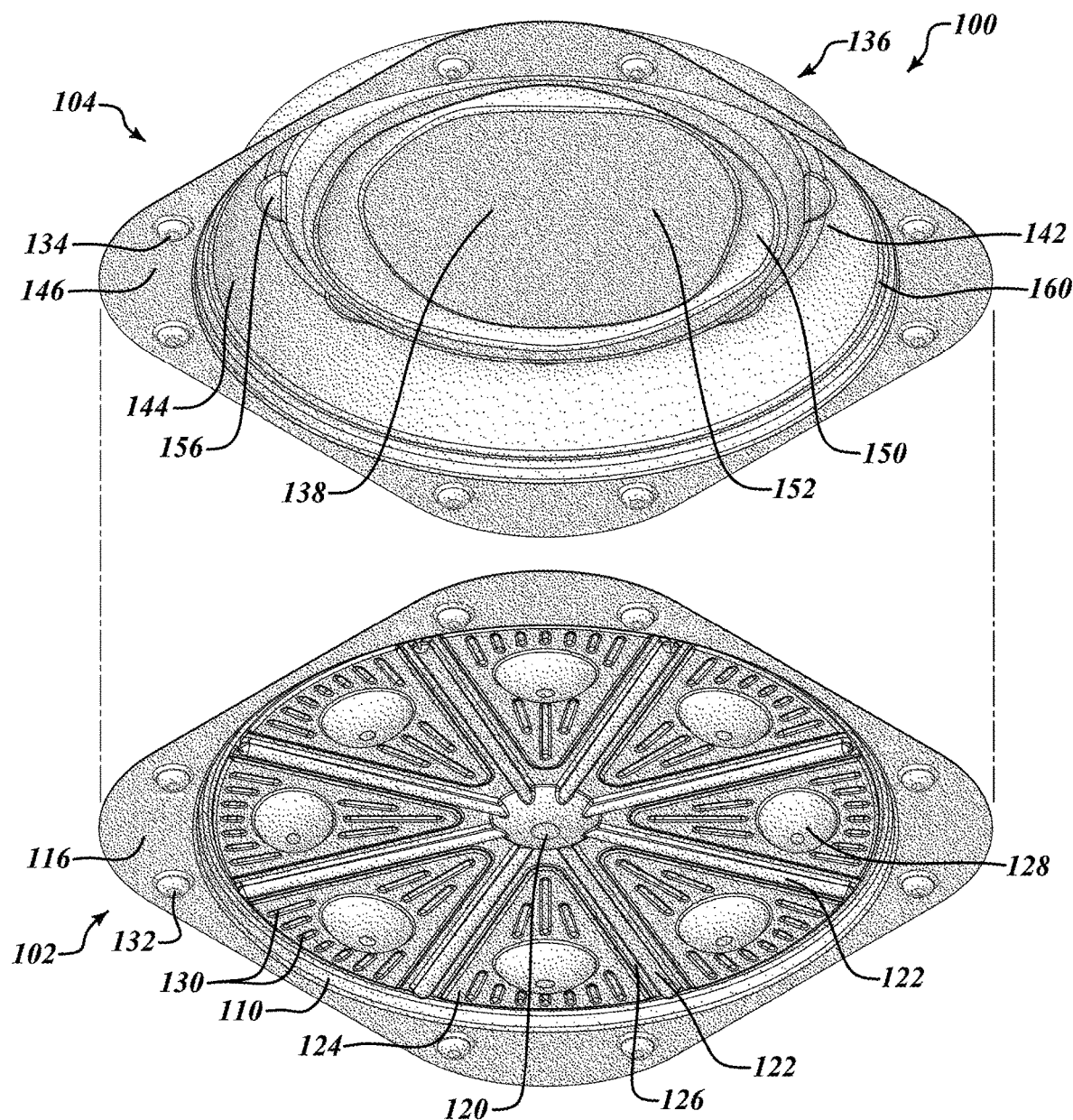
FIG. 2B is a bottom perspective view of the food container with the cover separated from the base, according to one illustrated implementation.
Figure 3:
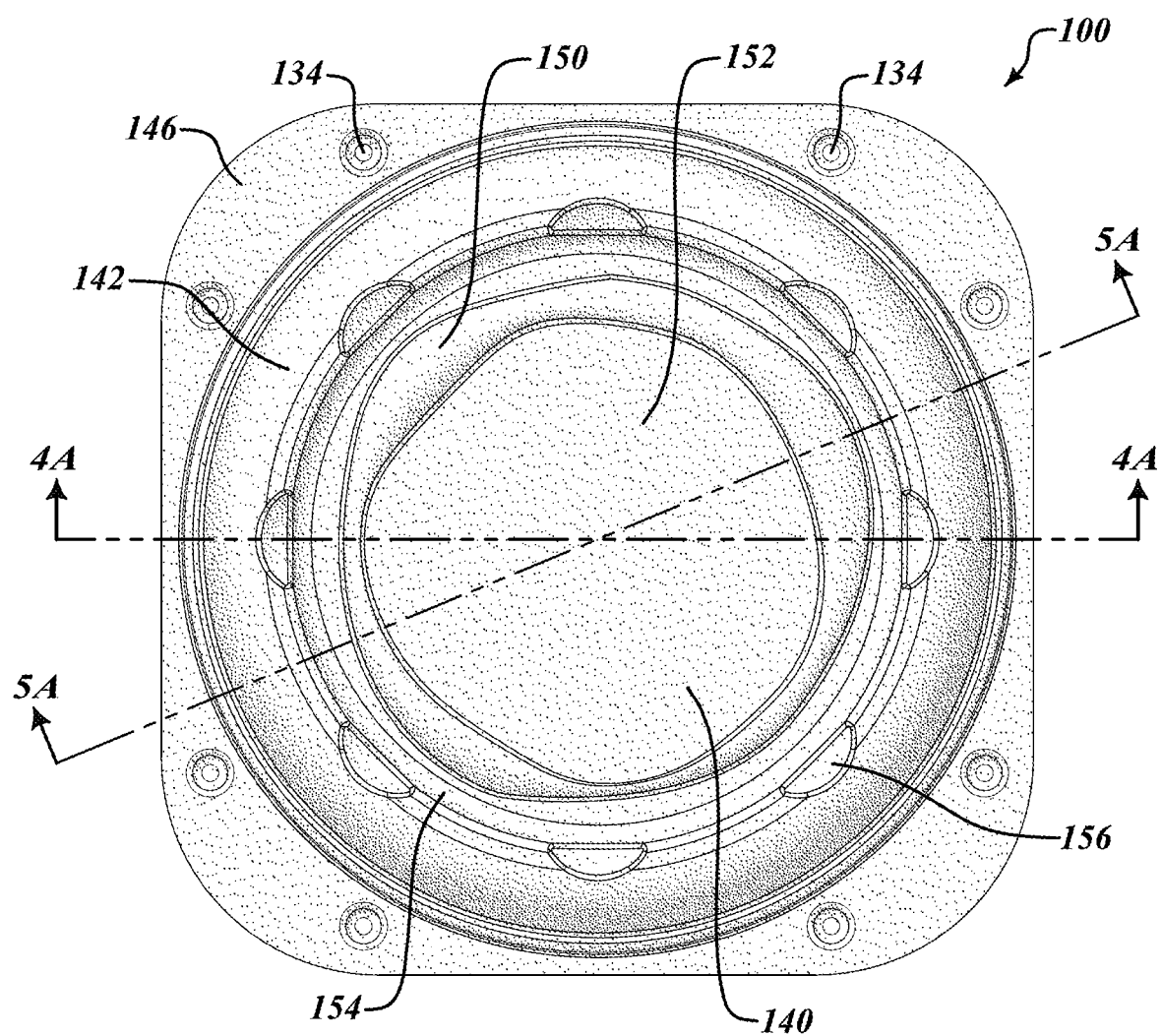
FIG. 3 is a top plan view of the food container, according to one illustrated implementation.

In operation, a user may select a base 102 from a stack of nested bases, place a food item (cooked or uncooked) onto the food receiving portion 108 of the base, select a cover 104 from a stack of nested covers, and lower the cover onto the base as shown in FIGS. 1A and 2A.

Because the food item is generally supported above the planar surface 109 of the food receiving portion 108 by the raised ribs 130 and sector portion rim 126 of each sector portion 124, liquid drippings from the food item fall away from the food item and into the sector wells 128, the central well 120 and/or the channels 122. Such features prevent the bottom of the food item from becoming soggy in addition to strengthening the rigidity of the food container. Thus, the aforementioned features of the food container 100 provide a housing which is lightweight, sturdy, compostable, and supports the food item in a manner which keeps the food item in a hot and dry condition, which preserves the freshness of the food item.

Figure 11A:
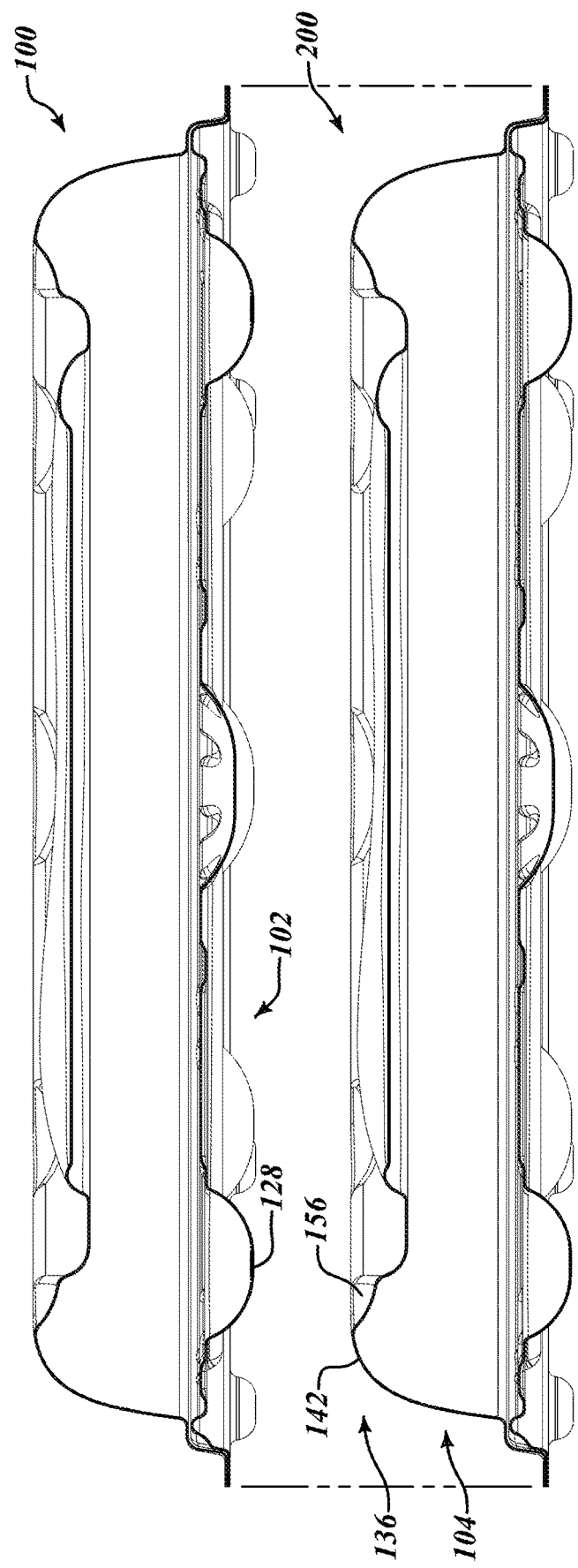
FIG. 11A is a sectional elevational view of a first food container vertically aligned with and spaced apart from a second food container, according to one illustrated implementation.
Figure 11B:
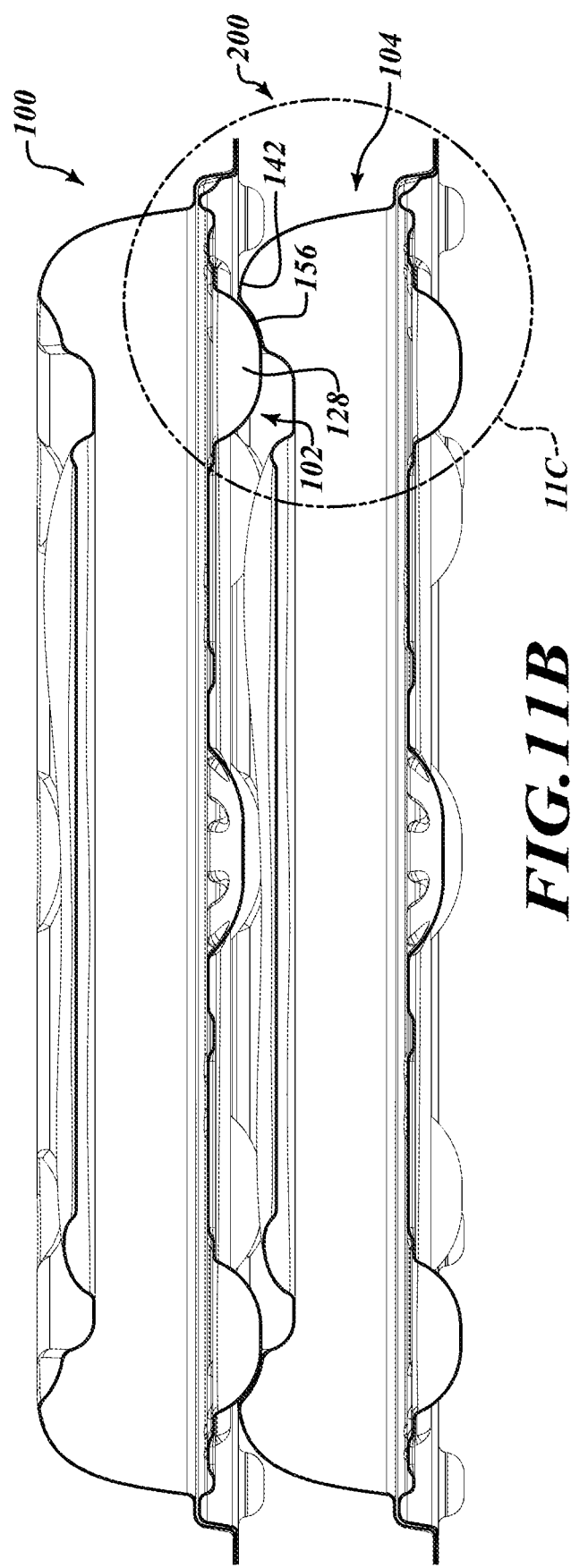
FIG. 11B is a sectional elevational view of the first and second food containers in a stacked relationship, according to one illustrated implementation.
Figure 11C:
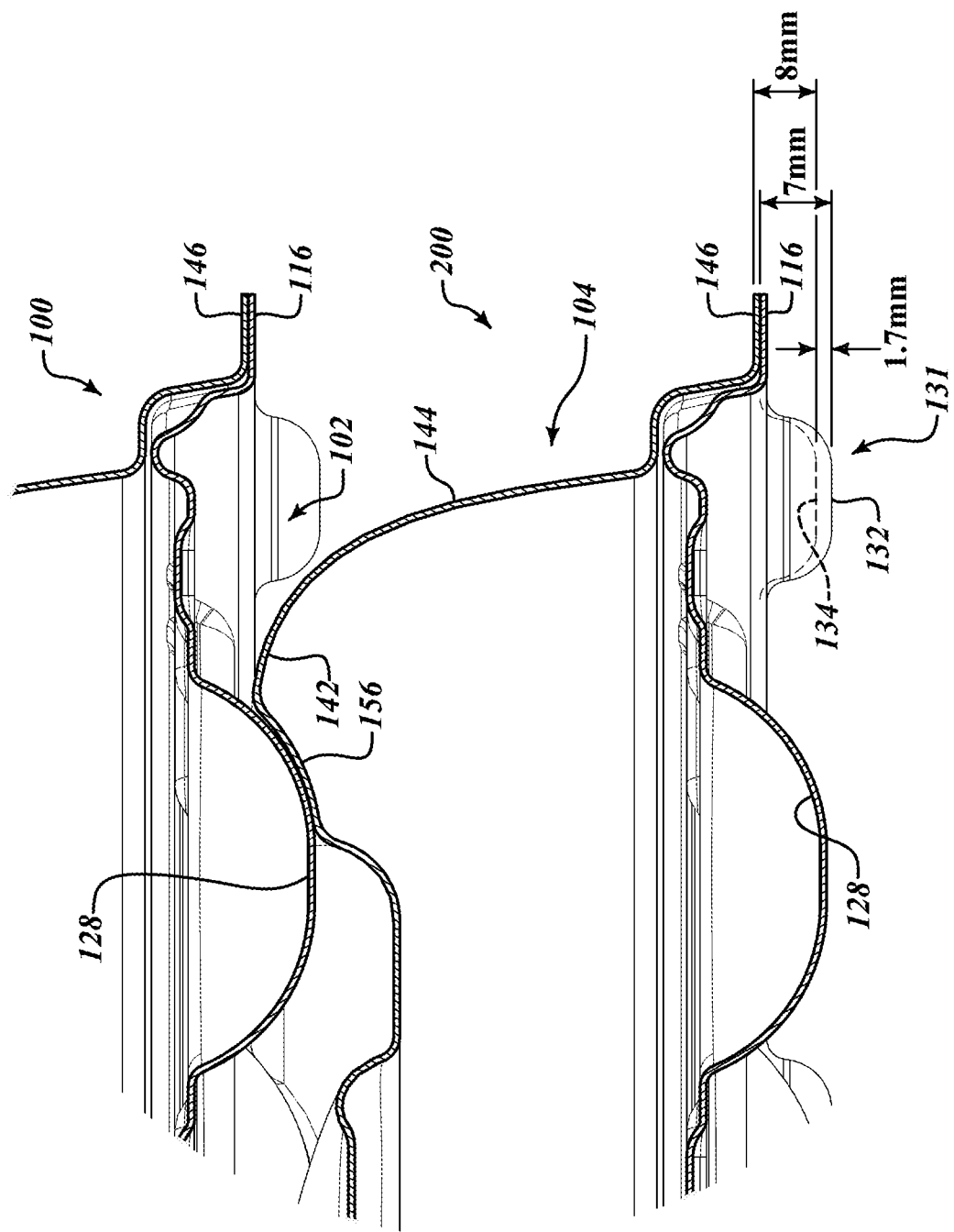
FIG. 11C is a detailed view of a portion of FIG. 11B, according to one illustrated implementation.

FIGS. 11A-11C show how the food container 100 is stackable with one or more other food containers, such as another food container 200 which is substantially the same or identical to the food container 100. As shown in FIG. 11C, an inward facing portion of the apex of the raised outer rim 142 of the central dome portion 136 of the cover 104 includes a plurality of dome recesses or seats 156 radially spaced from the center of the dome portion. Each of the dome recesses 156 are sized and dimensioned to receive at least a portion of one sector well 128 of a base 102 of another food container 100 when the other food container is stacked on top of the cover 104 of the food container 200. In some implementations, the shape of the recesses 156 may complement the shape of the sector wells 158 to maximize the contact surface area between the recesses and the sector wells. Thus, the sector wells 128 function as "feet" for the base of the food container 100 when the food container 100 is stacked on top of the food container 200. When in such a stacked relationship, only the sector wells 128 of the base 102 of the top food container 100 contact the dome recesses 156 of the cover 104 of the bottom food container 200, which provides a substantial air space between the two containers 100 and 200, thus minimizing heat transfer therebetween. Additionally, since the sector wells 128 of the base 102 of the top food container 100 are spaced apart from the food product in the food container 100 and the sector recesses 156 of the dome portion 136 of the bottom food container 200 are not in contact with the food product in the food container 200, surfaces of the food containers adjacent the hot food products do not contact each other when the containers are stacked, which further minimizes heat transfer between containers.

As discussed above, the outer rim 142 of the central dome portion 136 is structurally rigid and serves to distribute supporting forces of the sector wells 128 of the base 102 when the top food container 100 is stacked on the cover 104 of the bottom food container 200. Moreover, when the food container 100 is stacked on the food container 200 and the bottom surface of each of the sector wells 128 of the base 102 is received in a respective one of the dome recesses 156, the food container 100 and the food container 200 are restricted from lateral or rotational movement with respect to each other, which helps keep the food containers in a stacked relationship during transportation of the food containers.

Figure 12:
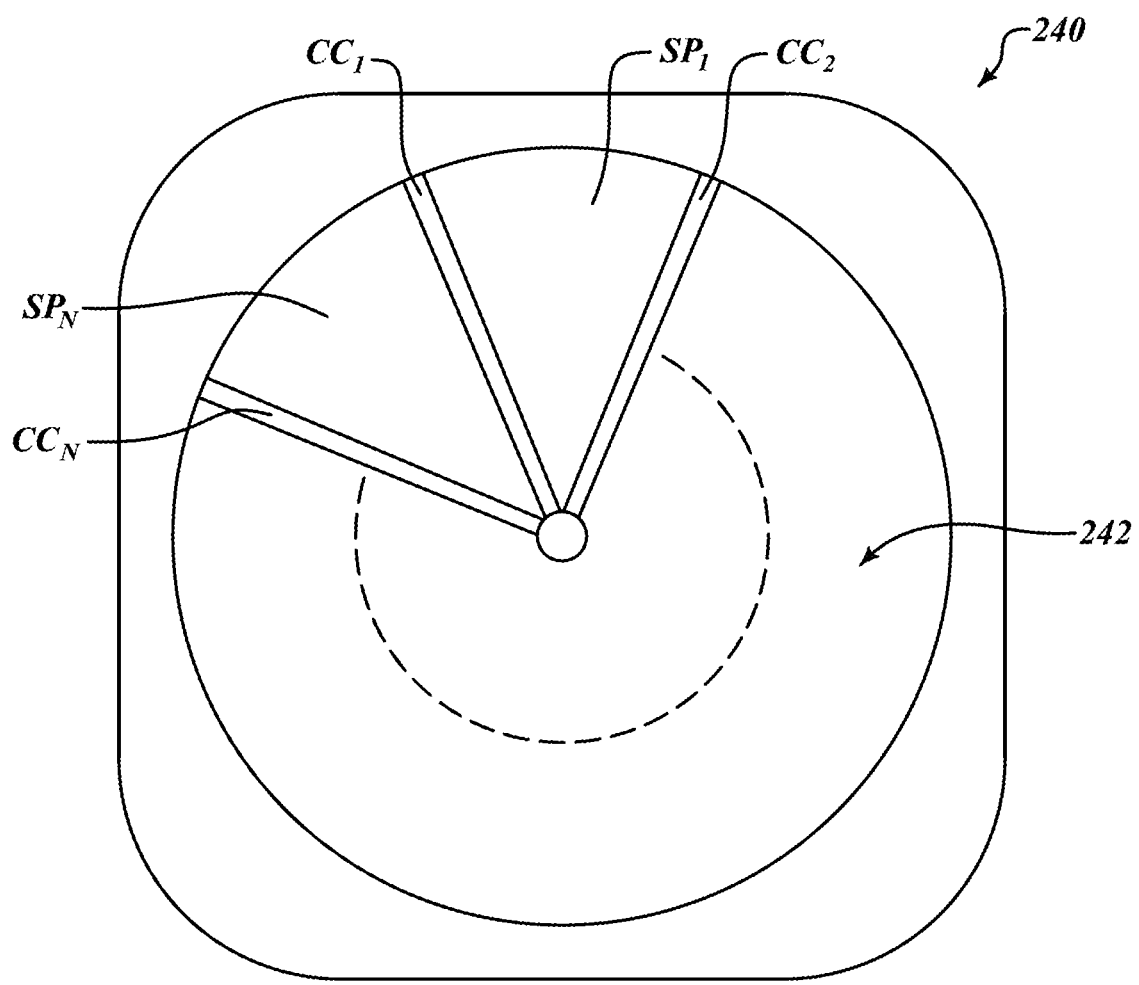
FIG. 12 is a top plan view of a food container which includes a number N of food receiving portion channels and a corresponding number N of sector portions, according to one illustrated implementation.

FIG. 12 shows a simplified schematic diagram of a base 240 for a food container. The base 240 may be similar or identical to the base 102 discussed above. In this implementation, the base 240 includes a food receiving portion 242 which includes a number N of channels $CC_{1-N}$ which delineate a corresponding number N of sector portions $SP_{1-N}$. The channels $CC_{1-N}$ and sector portions $SP_{1-N}$ may be similar to the channels 122 and sector portions 124, respectively, discussed above. As a non-limiting example, the number N may be equal to a positive integer (e.g., 4, 7, 8, 9, 10, 13, 16).

Figure 6:
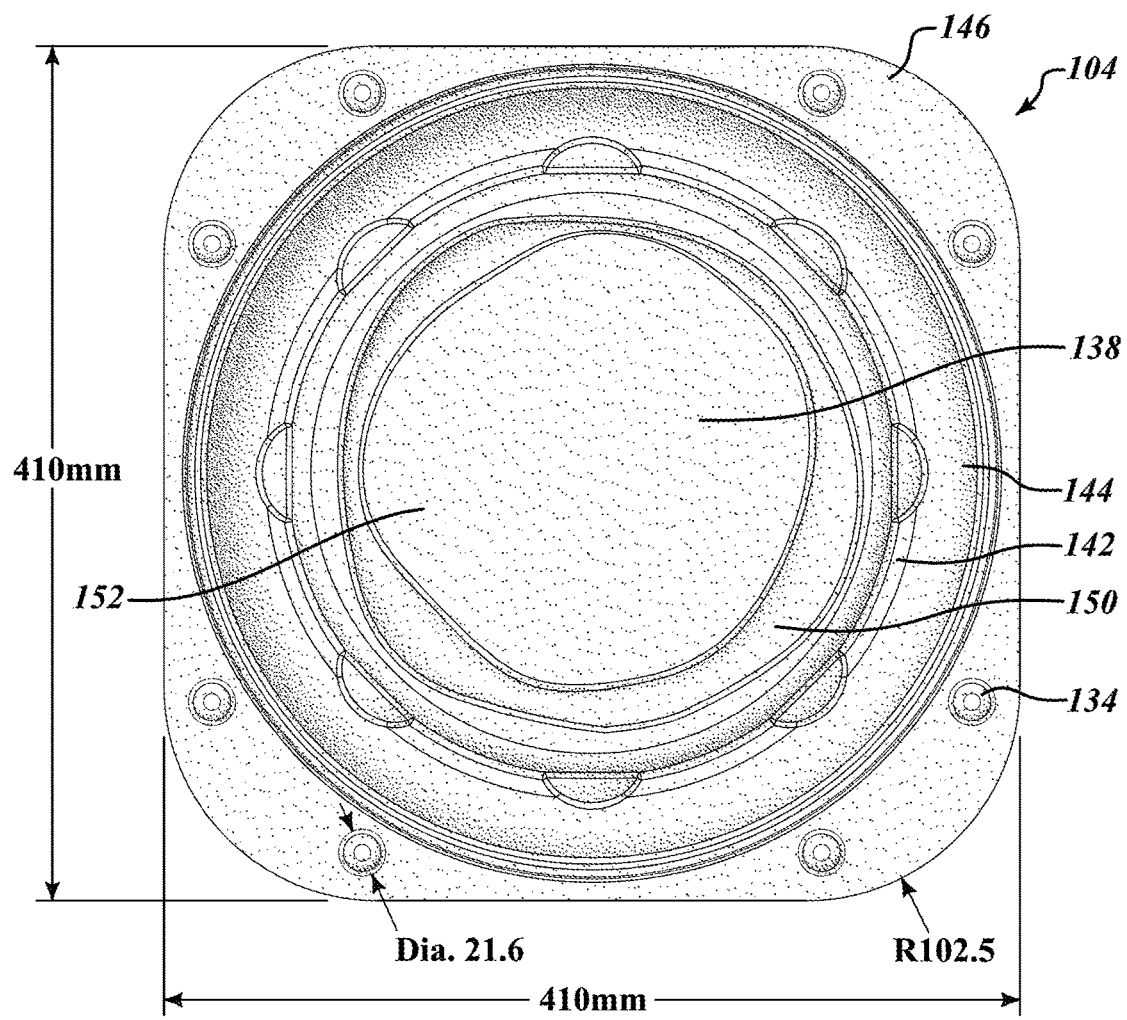
FIG. 6 is a bottom plan view of the cover of the food container, according to one illustrated implementation.
Figure 7:
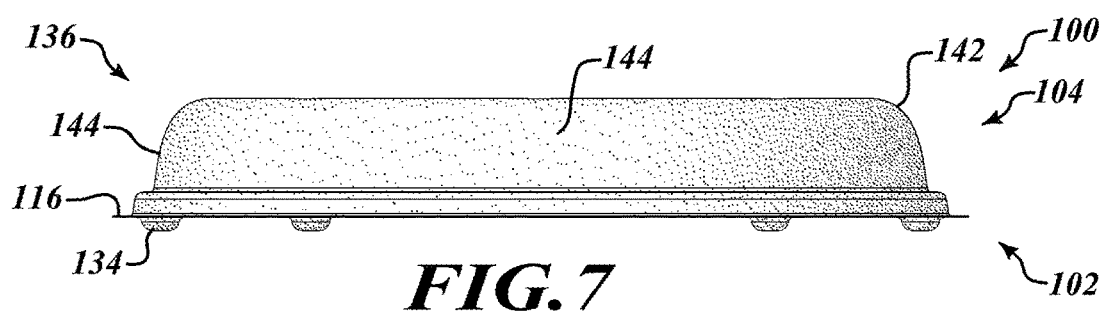
FIG. 7 is a front elevational view of the cover of the food container, according to one illustrated implementation.
Figure 8:
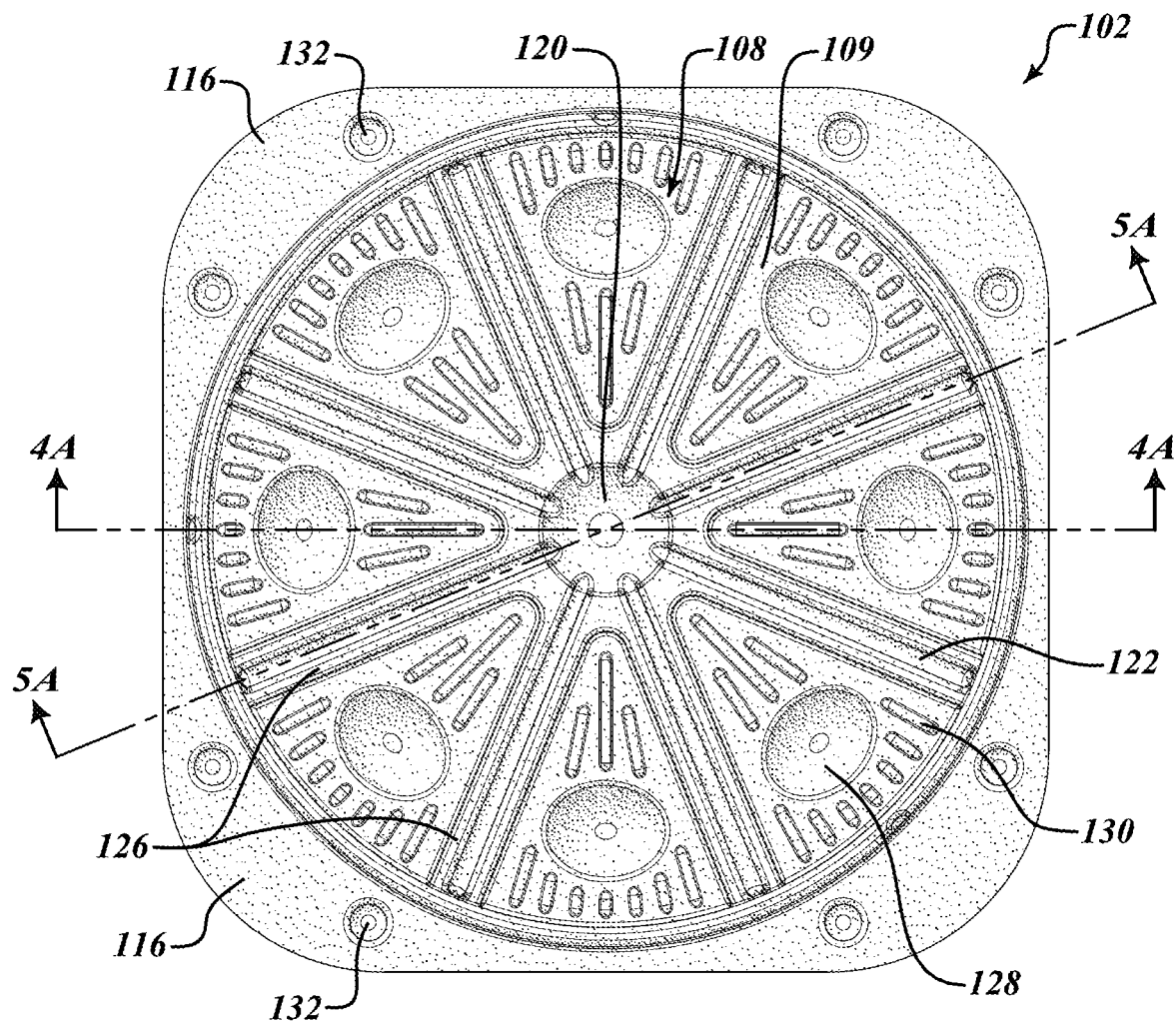
FIG. 8 is a top plan view of the base of the food container, according to one illustrated implementation.
Figure 9:
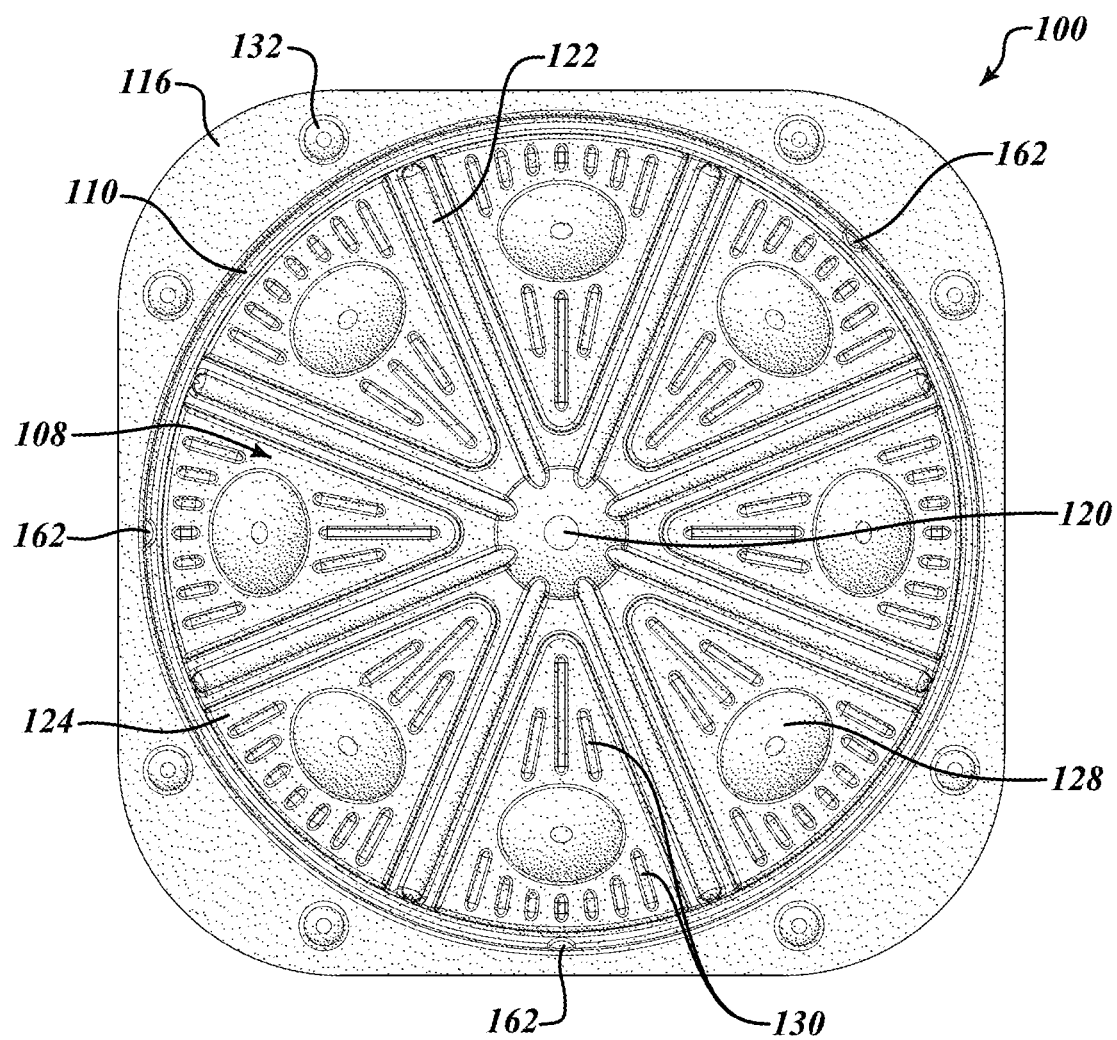
FIG. 9 is a bottom plan view of the food container, according to one illustrated implementation.
Figure 10:
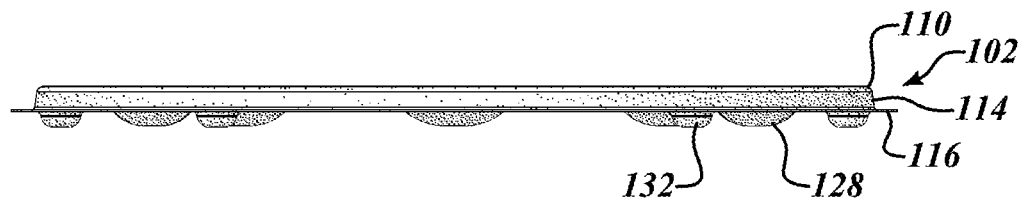
FIG. 10 is a front elevational view of the base of the food container, according to one illustrated implementation.
Figure 13:
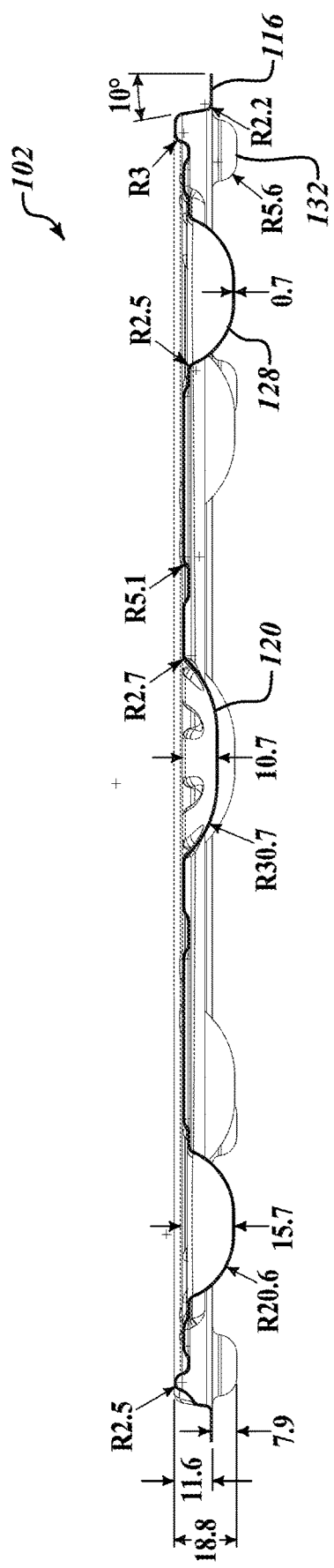
FIG. 13 is a sectional elevational view of the base of the food container, showing various dimensions thereof, according to one illustrated implementation.

FIG. 13 shows a sectional elevational view of the base 102 and includes a number of dimensional measurements and radius of curvature measurements in millimeters for the base 102, according to one or more implementations. FIG. 6 also shows example measurements for the outer edges of the cover 104 and/or base 102. As shown, in some implementations the base 102 and cover 104 may each have outer dimensions of 410 millimeters by 410 millimeters. The aforementioned strengthening structural features allow the food container 100 to be relatively large and to utilize a relatively thin layer of material for each of the base and the cover while providing the aforementioned required support for receiving a food item and/or stacking multiple food containers together. Such measurements are provided as examples and should not be considered to be limiting.

Referring now to FIG. 14A through FIG. 21, various views of a food container 300 are shown. The food container 300 may be similar or identical to the food containers 100 and 200 in many respects (e.g., shapes, materials, sizes, features). Accordingly, at least some of the discussion above is applicable to the food container 300 and may not be repeated below for the sake of brevity.

Figure 14A:
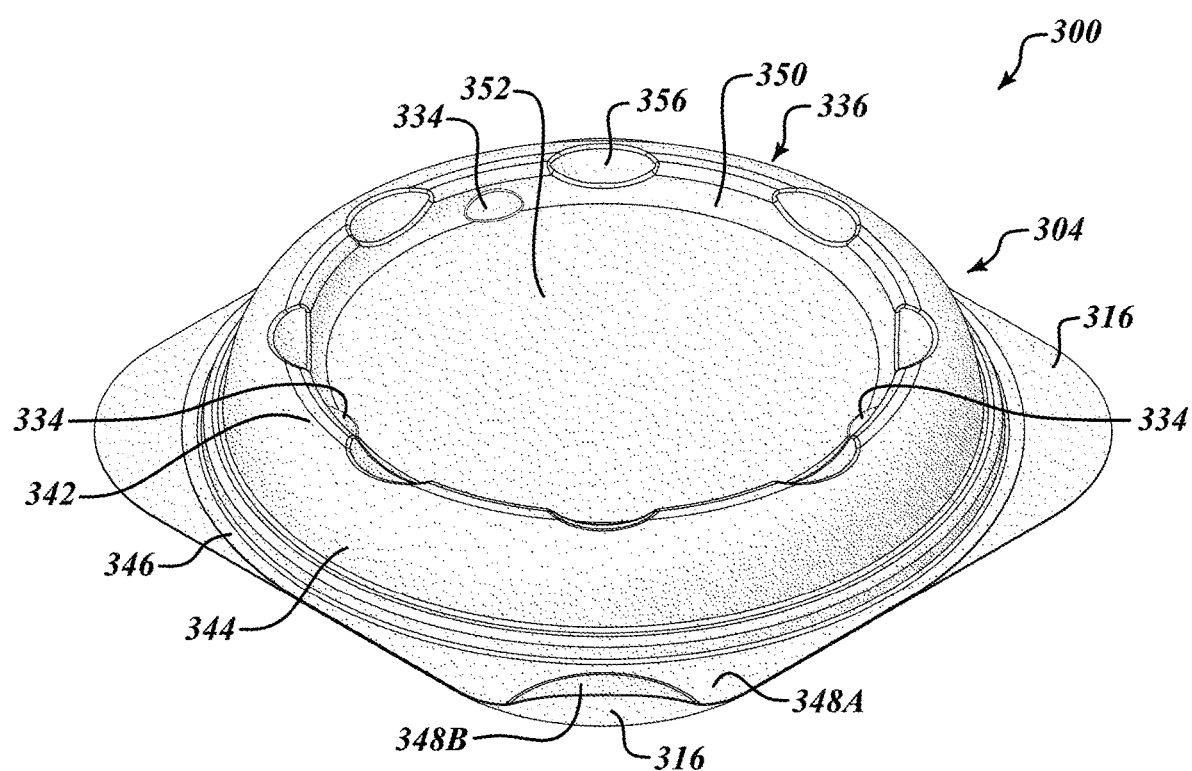
FIG. 14A is a top perspective view of another food container, according to one illustrated implementation.
Figure 14B:
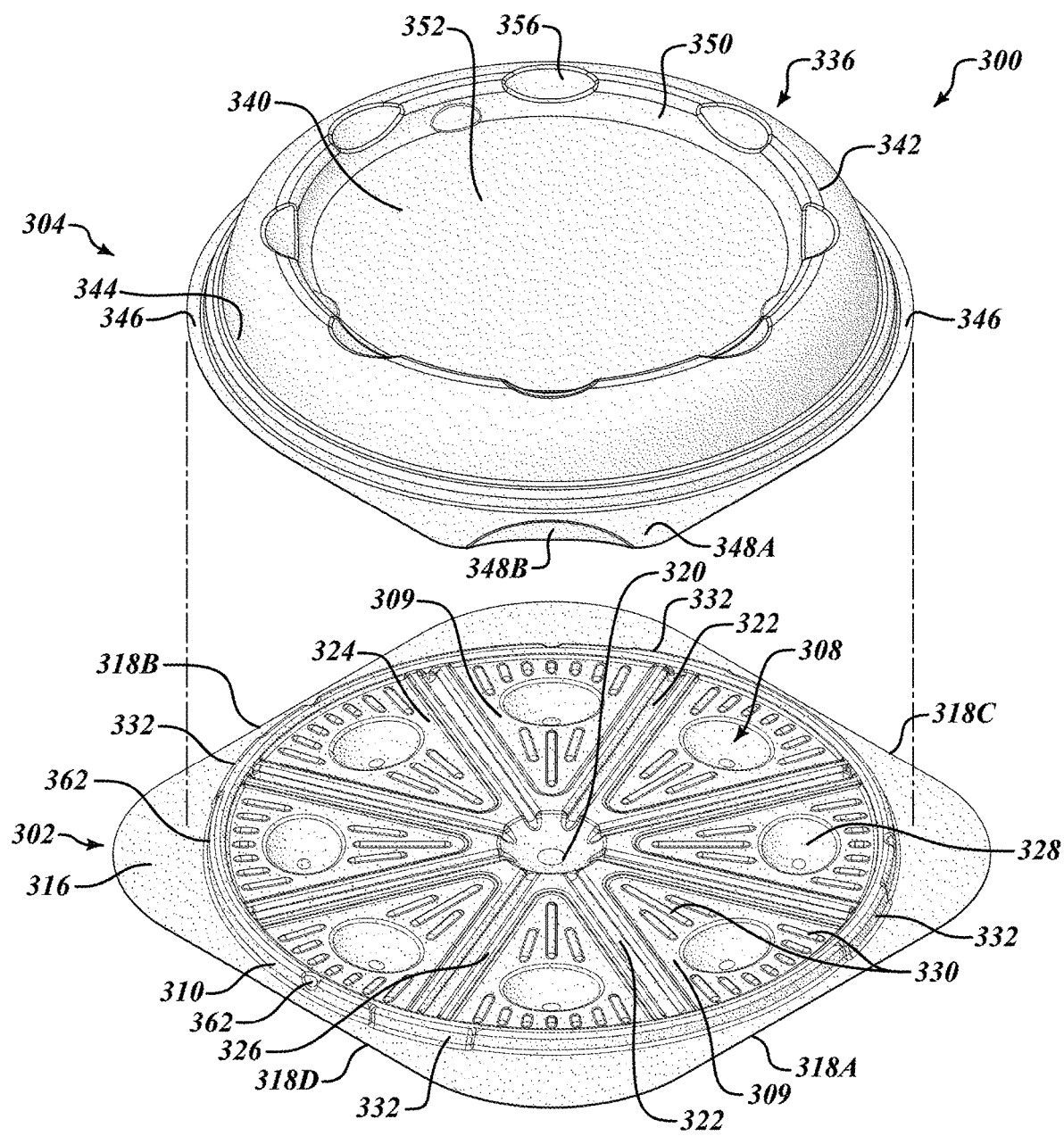
FIG. 14B is a top perspective view of the food container of FIG. 14A with a cover of the food container separated from a base thereof, according to one illustrated implementation.
Figure 15A:
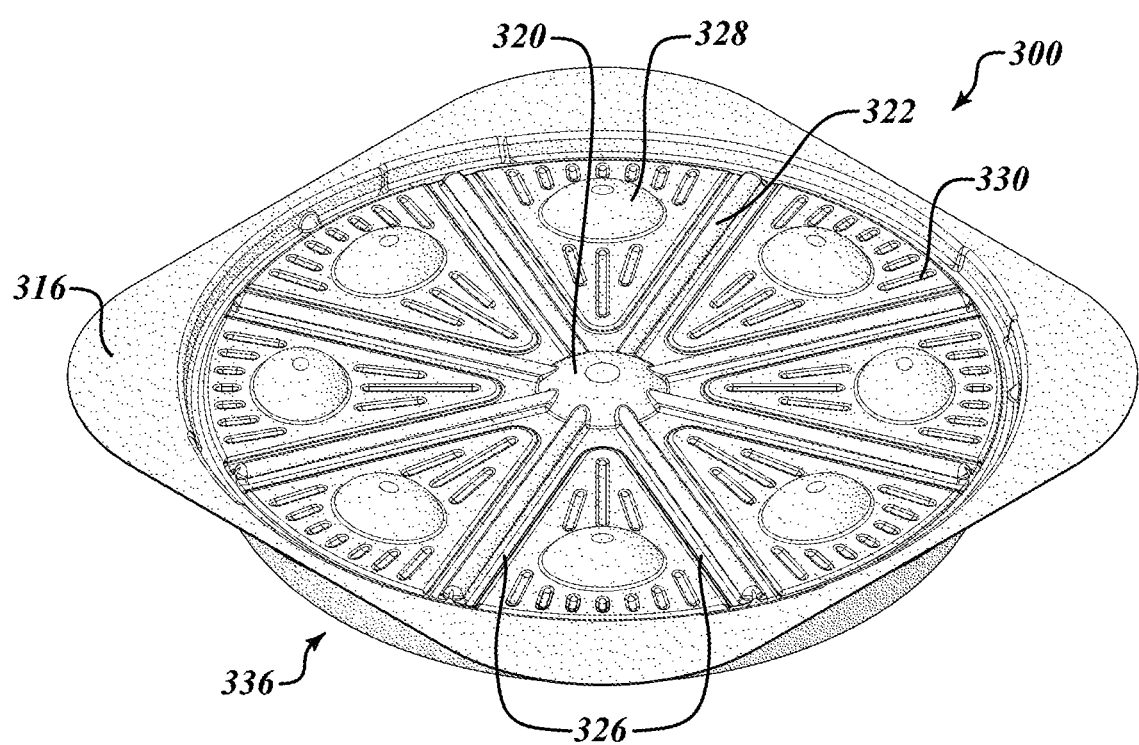
FIG. 15A is a bottom perspective view of the food container of FIG. 14A, according to one illustrated implementation.
Figure 15B:
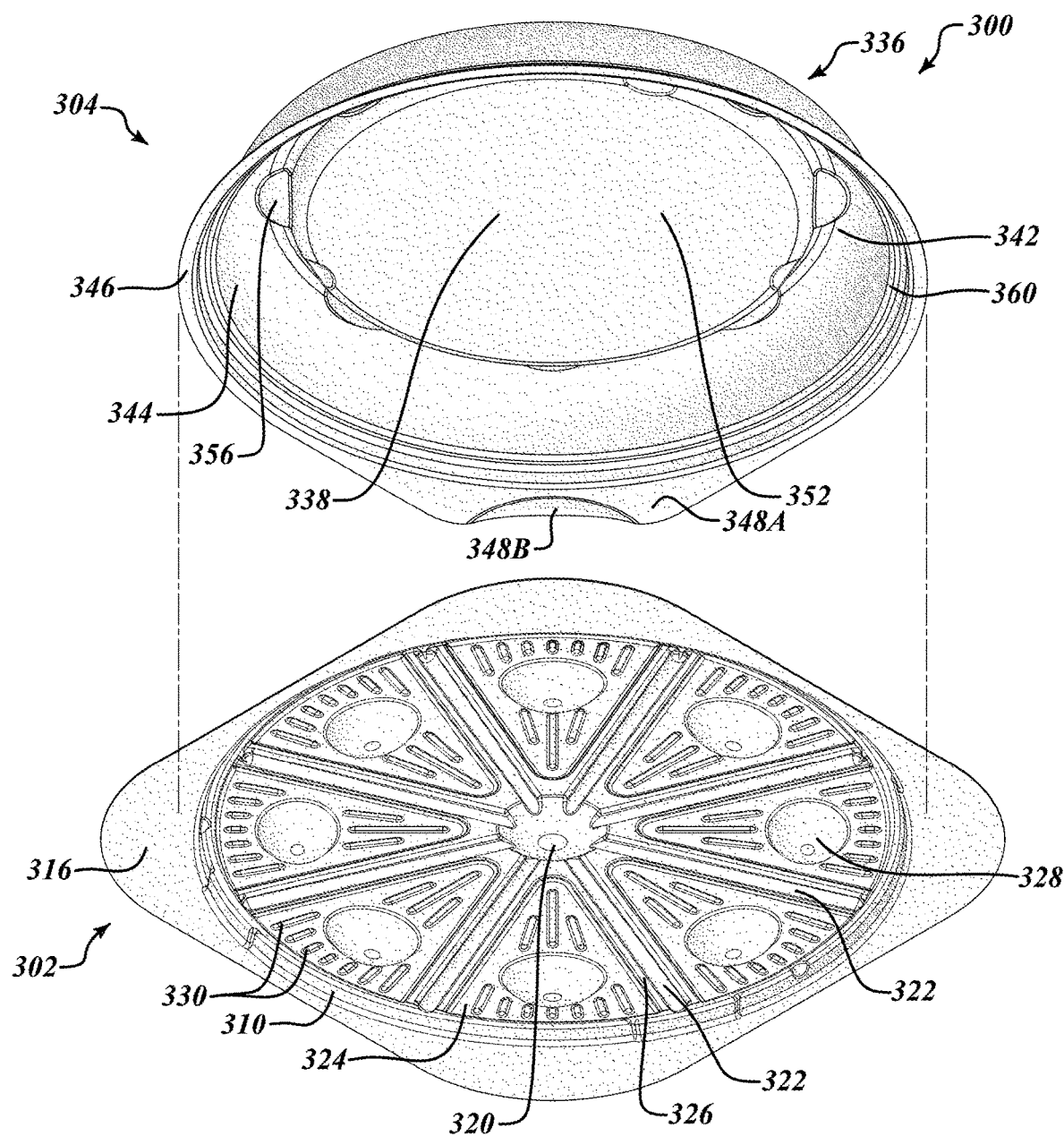
FIG. 15B is a bottom perspective view of the food container of FIG. 14A with the cover separated from the base, according to one illustrated implementation.
Figure 16:
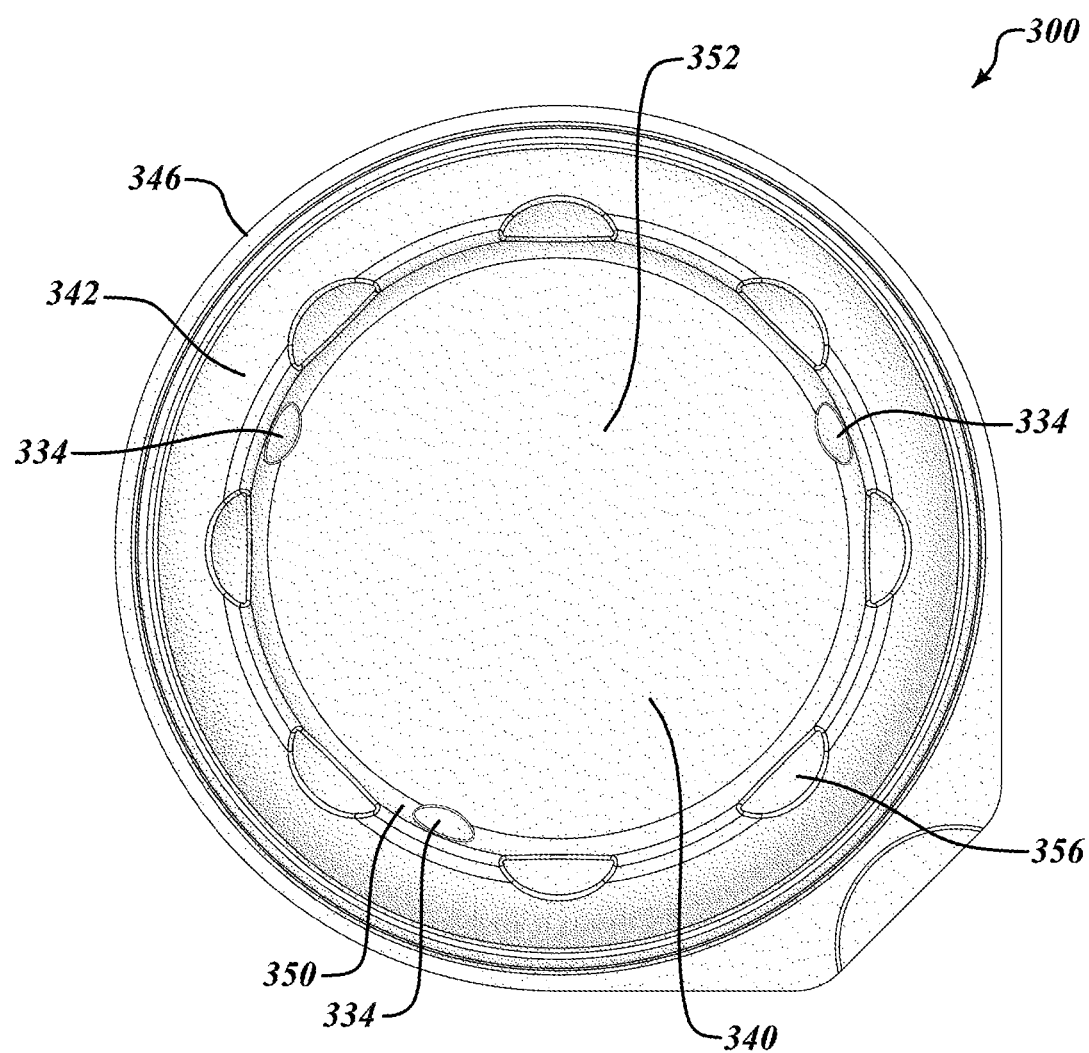
FIG. 16 is a top plan view of the food container of FIG. 14A, according to one illustrated implementation.
Figure 17:
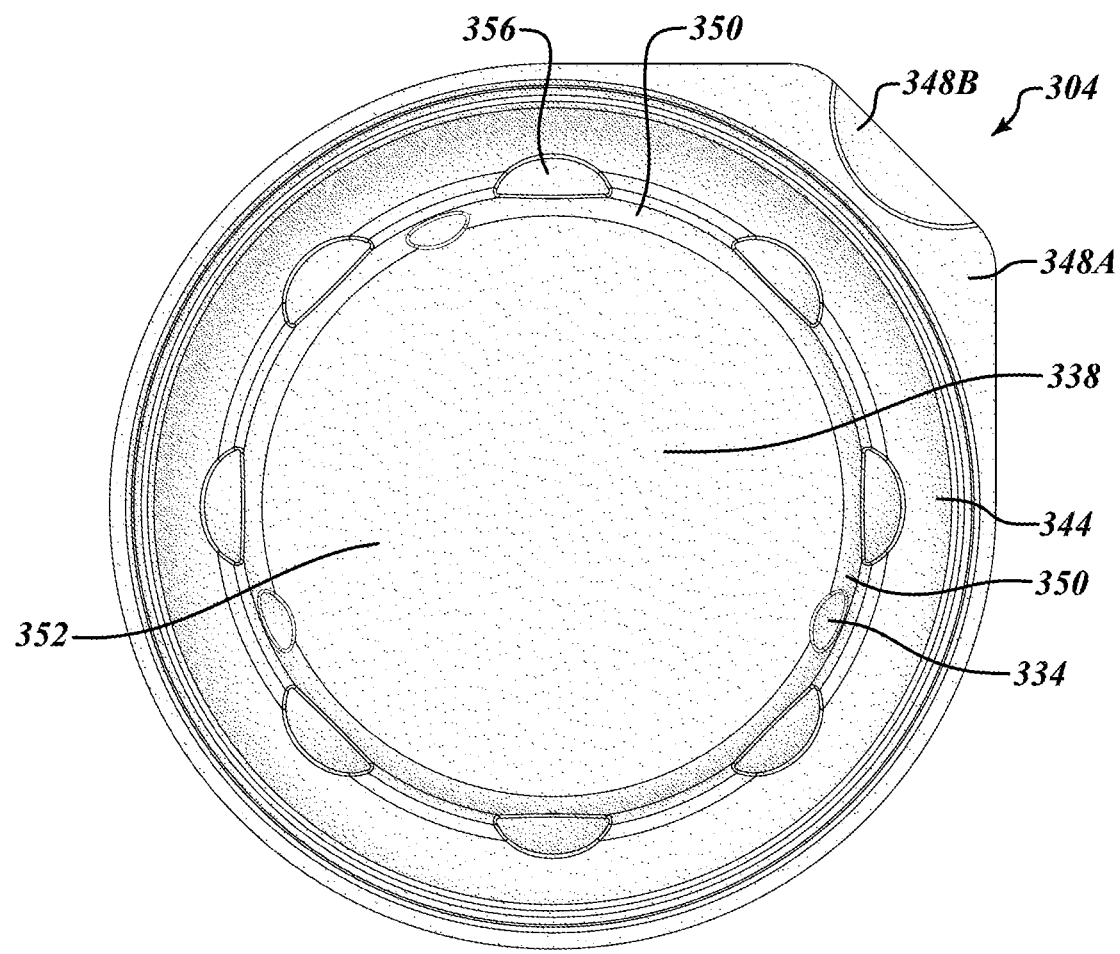
FIG. 17 is a bottom plan view of the cover of the food container of FIG. 14A, according to one illustrated implementation.
Figure 18:
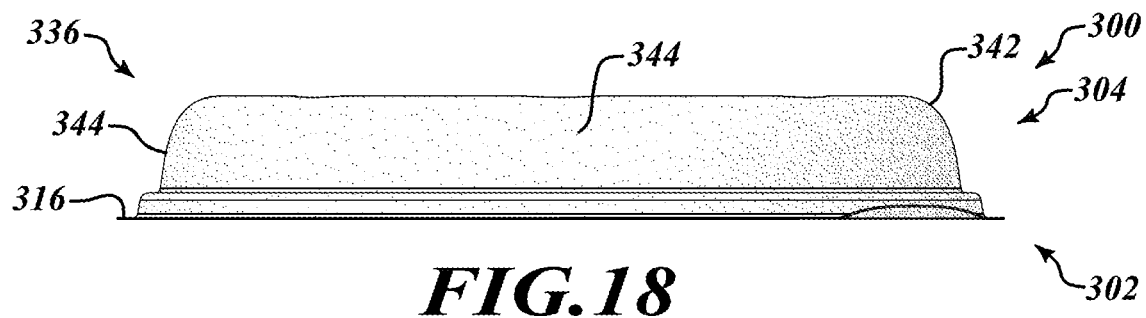
FIG. 18 is a front elevational view of the cover of the food container of FIG. 14A, according to one illustrated implementation.
Figure 19:
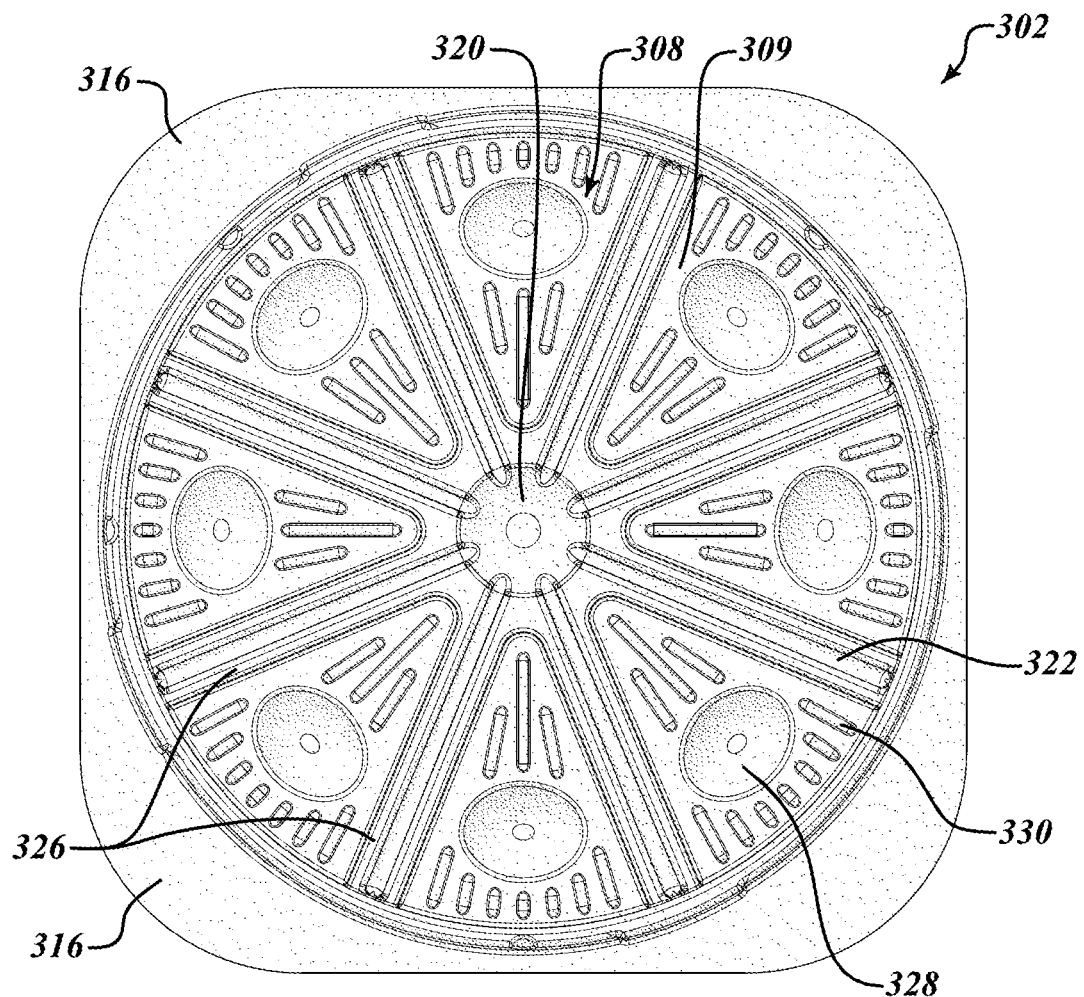
FIG. 19 is a top plan view of the base of the food container of FIG. 14A, according to one illustrated implementation.
Figure 20:
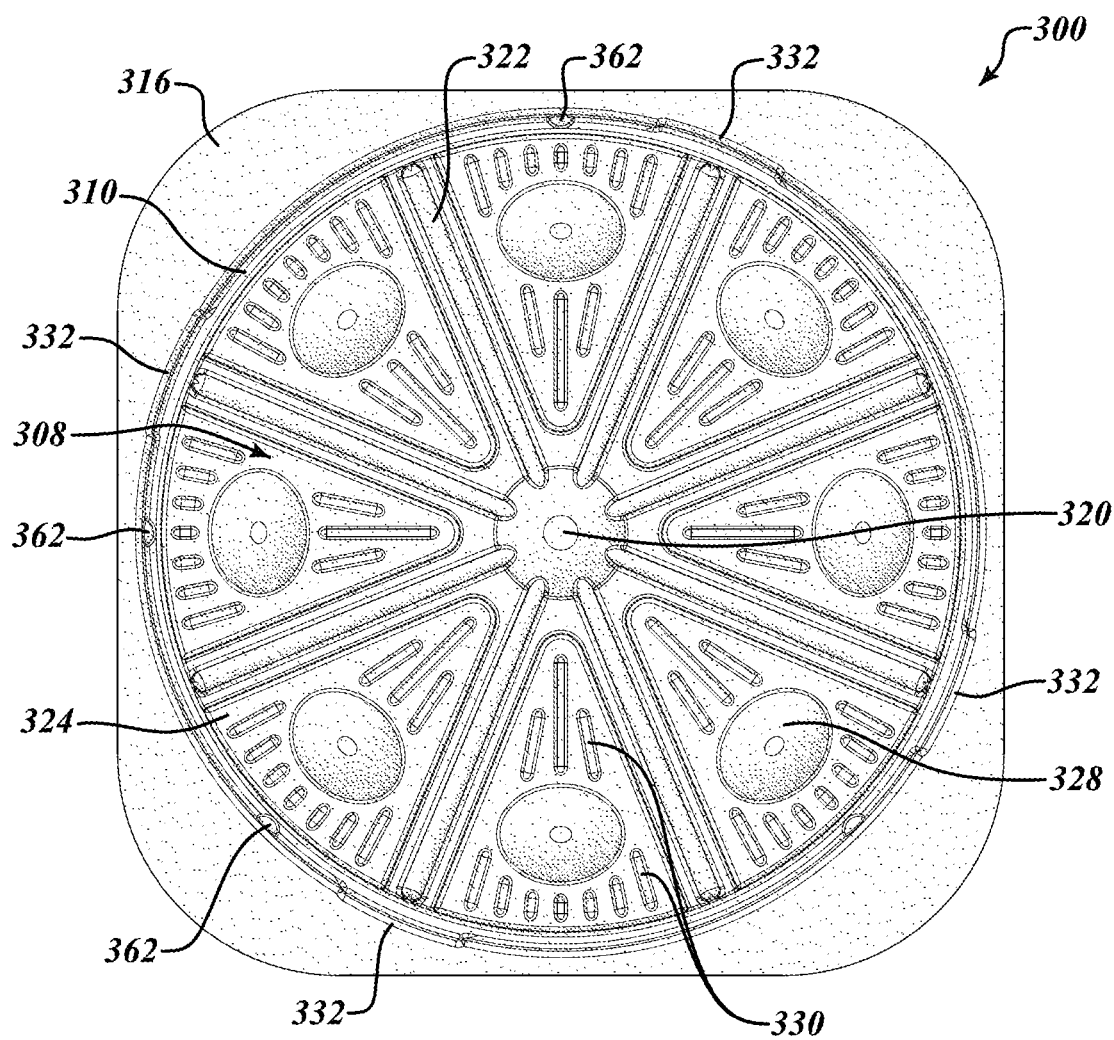
FIG. 20 is a bottom plan view of the food container of FIG. 14A, according to one illustrated implementation.
Figure 21:
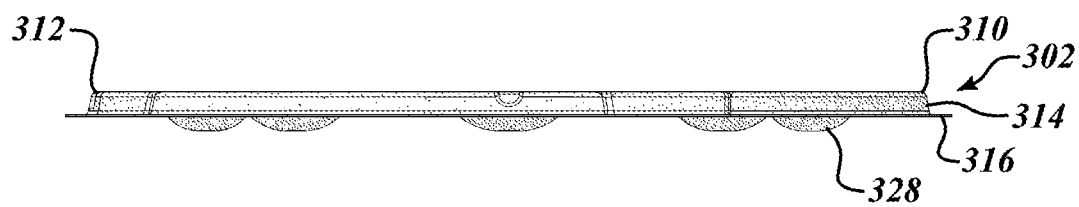
FIG. 21 is a front elevational view of the base of the food container of FIG. 14A, according to one illustrated implementation.

As shown in FIG. 14B, the food container 300 includes a base 302 and a separate cover 304 which cooperate as shown in the figures and described below to form a closed chamber for supporting, protecting, insulating and optionally cooking a food product (e.g., pizza). In at least some implementations, the base 302 is formed of a single layer of insulating material and includes an upwardly facing circular-shaped food receiving portion 308 which receives the pizza thereon. The base 302 further includes a raised peripheral rim 310 disposed about a perimeter of the food receiving portion 308. The rim 310 comprises a raised upwardly facing apex surface 312 (FIG. 21) and a downwardly and outwardly extending sidewall 314 which meets with a substantially planar base flange 316 that extends outwardly from the rim. As shown in FIG. 14B, the base flange 316 has a substantially rectangular-shaped (e.g., square) outer perimeter with rounded corners defined by first and second parallel edges 318A and 318B and third and fourth parallel edges 318C and 318D. Among other things, the base flange 316 strengthens the rigidity of the base 302.

The food receiving portion 308 of the base 302 includes a planar surface 309 and a number of features which extend at least one of upward or downward from the planar surface 309. In particular, the food receiving portion 308 includes a central well 320 which extends downwardly from the planar surface 309 and receives liquid drippings or condensation from the cooked food (e.g., pizza) placed in the food container 300. In the illustrated implementation, the central well 320 has a circular perimeter, but may have other shapes (e.g., triangle, octagon) in other implementations.

The food receiving portion 308 also includes a plurality of food receiving portion channels or grooves 322 (also referred to herein as "channels") extending downwardly below the planar surface 309 and running radially outward from the central well 320 and terminating at the raised peripheral rim 310. In some implementations, the radial channels 322 may extend only partially between the central well 320 and the raised peripheral rim 310. In the illustrated implementation, each of the channels 322 has a U-shaped cross-sectional profile, but in other implementations the channels may have other shapes (e.g., V-shaped). In some implementations, each channel 322 may slope downward from the rim 310 toward the central well 320 to facilitate the flow of liquid through the channel into the central well. Each pair of adjacent channels 322 and a corresponding portion of the raised peripheral rim 310 delineate a respective sector portion 324 of the food receiving portion 308 which supports a portion of a food item (e.g., an individual slice of pizza). In the illustrated implementation, the base 302 includes eight channels 322 and eight sector portions 324. Generally the base 302 may include N channels and N sector portions, where N is a positive integer.

The plurality of channels 322 are equally radially spaced to enable cutting of the food item (e.g., pizza) into equally sized pieces when a cutting tool (e.g., knife) moves along the channels. Since the channels 322 extended downward from the planar surface 309, a user may cut through the food item over the channels without damaging (e.g., cutting) the food receiving portion 308 of the base 302. Further, each of the channels 322 are non-parallel with each of the edges 318A-318D of the base 302, which improves the rigidity of the base. In the illustrated implementation, each of the channels 322 is offset by 22.5° from perpendicular from a respective one of the edges 318A-318D which the channel extends toward. Further, each of the channels 322 is collinear with an opposite channel that extends radially in the opposite direction. Thus, when the base 304 is to be discarded (e.g., composted), the user may fold the base along an axis which extends through two opposing collinear channels to reduce the dimensions of the base so the base will fit within a compost receptacle.

Among other things, the channels 322 function to strengthen the base 302 in rigidity and provide supporting forces to the food receiving portion 308 when the base is disposed on a resting surface, such as a countertop, oven or another food container. The channels 322 also serve as guides for a cutting tool to cut eight equally sized pieces of a food item (e.g., pizza). Further, the channels 322 provide air space below the food item, which provides additional insulation. In some implementations, because the channels 322 may be substantially covered by the food item placed on the food receiving portion 308, indicia (e.g., visible and/or tactile markings) may be positioned on or adjacent the rim 310 radially in line with the channels to aid the user in cutting the pizza into pieces along the channels.

As discussed above, each pair of adjacent channels 322 and a corresponding portion (e.g., a 45° arc portion) of the raised peripheral rim 310 delineate a respective sector portion 324 of the food receiving portion 308 which receives an individual piece of the food item (e.g., slice of pizza). Each sector portion 324 includes a portion of the planar surface 309 and a raised sector portion rim 326 (FIG. 14B) which extends upward from the planar surface and adjacent each of the channels 322 which define the sector portion. In addition to supporting the food item above the planar surface 309, the raised sector portion rim 326 adjacent the channels 322 may aid in supporting the food item near the cutting location, thereby facilitating the cutting process to provide accurate individual pieces.

Each sector portion 324 further includes a sector well 328 which may receive liquid drippings from the food product therein. In the illustrated implementation, each sector well has a perimeter rim adjacent the planar surface 309 which has an oval profile. In other implementations, each of the perimeter rims may have a profile in the shape of at least one of a circle, a triangle, a square, another shape, or a symbol (e.g., logo). Each sector portion 324 also includes a plurality of raised sector ribs or projections 330 which extend upward from the planar surface 309 around the sector well 328 having an uppermost portion which supports the hot food product (e.g., pizza). In some implementations, the combined area of the ribs 330 in a sector portion 324 is smaller than the portion of the planar surface 309 in the sector portion. Thus, when the food product is supported on the uppermost portions of the ribs 330 and the raised sector portion rim 326, heat loss due to conduction through the planar surface 309 is substantially reduced compared to food containers with flat bottom surfaces which have relatively large surface area contact with the bottom surface of the food product. Additionally, the raised ribs 330 and sector portion rim 326 tend to isolate the bottom surface of the food product from the planar surface 309, which prevents the food product from becoming soggy due to trapped liquid on the planar surface 309 of the food receiving portion 308.

In the illustrated implementations, the shapes of the ribs 330 are elongated and have a length dimension which extends radially with respect to the central well 320. Additionally, in the illustrated implementations the ribs 330 are radially symmetrical. In other implementations, the number, sizes and dimensions of the raised ribs 330 may be different from shown in the figures. The raised ribs 330 also function to improve the rigidity of the base 302.

In some implementations, each of a plurality of features of the base 302 comprising the raised rim 310, the central well 320, the sector wells 328, the channels 322, and the raised sector ribs 330 is spaced apart from at least one other of the plurality of features by a distance which is less than or equal to one inch. In some implementations, due to the aforementioned plurality of features, the food receiving portion 308 of the base 302 does not have a continuously planar surface which exceeds 2 inches by 2 inches. Such features significantly improve the strength of the base 302, while allowing the base to have a length dimension greater than 12 inches (e.g., 16 inches), a width dimension greater than 12 inches (e.g., 16 inches), an overall height which is less than 1.5 inches (e.g., 1 inch), and a material thickness between 0.5 mm and 1.0 mm (e.g., 0.8 mm). In other implementations, the base 302 may have a relatively larger height and the cover 304 may have a relatively smaller height.

The outward facing sidewall 314 of the raised rim 310 of the base 302 includes four cover interface portions 332 spaced 90° apart from each other that extend radially outward from the remainder of the outward facing sidewall 314. As discussed further below, the cover interface portions 332 of the base 302 engage an inwardly and downwardly facing perimeter channel 360 of the cover 304 when the cover is engaged with the base to provide a friction fit between the cover and the base, which retains the cover on the base until removed by a user.

In some implementations, at least some of the central well 320 and the sector wells 328 extend downwardly to a lowermost portion of the base 302 so that they are weight-bearing and function as "feet" which form an insulating air space below the food receiving portion 308 of the base 302 and a resting surface when the base is supported on the resting surface. Thus, the raised ribs 330 of each sector portion, together with at least some of the central well 320 and the sector wells 328, form a layer of air insulation between the planar surface 309 of the food receiving portion 308 and the food product and a layer of air insulation between the food receiving portion and a resting surface using only a single layer of material (i.e., the material which forms the base 302). Additionally, the aforementioned "feet" raise the remainder of the base 302 (and cover 304 when engaged with the base) slightly above a resting surface (e.g., table), which causes a shadow to be cast, similar to a more formal serving plate.

The cover 304 comprises a single layer of thermally insulating material (e.g., molded fiber) and includes a central dome portion 336 comprising a substantially downward facing interior surface 338 (FIG. 15B) and a substantially upward facing exterior surface 340 (FIG. 14B). In at least some implementations, the exterior surface 340 is circular in shape which facilitates printing (e.g., laser printing, pad printing) thereon with text and/or graphics (e.g., logo, image, instructions). As shown in FIG. 14B, the dome portion 336 comprises a raised outer rim 342 spaced radially outward from the center of the dome portion which terminates in a downwardly and outwardly extending sidewall 344. The sidewall 344 meets with a cover flange 346 which extends laterally outwardly therefrom. The cover flange 346 has a substantially circular-shaped outer perimeter and includes tab portion 348A that may align with one of the four corner portions of the base flange 316 when the cover 304 is engaged with the base. The tab portion 348A may be planar in shape or may have a distal portion 348B that extends upward that may be grasped by the user to remove the cover 304 from the base 302 during use. Among other things, the cover flange 346 strengthens the rigidity of the cover 304.

The dome portion 336 further comprises a substantially planar ceiling portion 352 disposed radially inward of the raised outer rim 342. The raised outer rim 342 provides rigidity to the dome portion 336 which, as discussed below, provides support to the ceiling portion 352 and facilitates stacking of multiple containers 300 together. The outer rim 342 of the central dome portion 336 also includes eight spaced apart dome recesses 356 each sized and dimensioned to receive at least a portion of a corresponding sector well 328 of a base 302 of another food container 300 when the other food container is stacked on top of the cover 304 of the food container.

As noted above, the interior surface 338 of the sidewall 344 of the central dome portion 336 has the perimeter channel 360 sized and dimensioned to engage the cover interface portions 332 of the raised perimeter rim 310 of the base 302 when the cover 304 is engaged with the base. In some implementations, the perimeter channel 360 and the cover interface portions 332 of the raised rim 310 are sized and dimension to form a friction or interference fit therebetween when the cover 304 is engaged with the base 302.

The various features of the dome portion 336 provide significant strength which, among other things, allows for stacking multiple food containers 300 together. Specifically, the dome portion 336 includes several curved or cornered portions which together improve the rigidity of the cover 304. For example, the dome portion 336 includes the perimeter channel 360 adjacent the base flange 316, the curved sidewall 344 radially inward of the perimeter channel, the raised outer rim 342 radially inward of the sidewall, and the planar ceiling portion 352 radially inward of the raised inner rim.

As shown in FIG. 14B, in some implementations, the raised rim 310 of the base 302 includes one or more grooves or notches 362 at an intersection of the top surface 312 and the sidewall 314 of the rim 310. Such grooves 362 may function to release the seal between the cover 304 and the base 302 when the user begins to lift the cover from the base prior to the perimeter channel 360 disengaging with the cover interface portions 332 of the raised rim 310. Such feature advantageously makes the cover 304 easier to remove from the base 302 when a user desires to access the food item in the food container 300.

The base 302 and cover 304 of the food container 300 may be nestable with other bases and covers, respectively, with a minimum amount of vertical height (i.e., essentially the thickness of the material for each component). That is, when a first base 302 is stacked on top of a second base, the top surfaces of the features of the lower second base are positioned adjacent the bottom surfaces of corresponding features of the upper first base, with minimal air space therebetween. Similarly, when a first cover 304 is stacked on top of a second cover, the top surfaces of the features of the lower second cover are positioned adjacent the bottom surfaces of corresponding features of the upper first cover. Thus, numerous bases may be stacked together at a height which is much less than the combined height of the individual bases. Similarly, numerous covers may be stacked together at a height which is much less than the combined height of the individual covers. Such nesting feature is advantageous for shipping and for storing the food containers 300 in a small space (e.g., restaurant, vehicle, packaging).

In at least some implementations, the cover 304 may include one or more spaced apart denesting lugs 334 disposed on an inward facing surface 350 of the dome portion 336 spaced radially inward from the raised outer rim 342. The denesting lugs 334 may be spaced apart from each other at uneven intervals around the circumference of inward facing surface 350. The denesting lugs 334 operate to make it easier for a user to separate the covers from one another when stacked. Thus, for example, a manufacturer of the covers may provide a number of the covers stacked together which may be easily separated prior to use. In particular, the denesting lugs 334 provide spacing between two stacked covers 304, which allows for ease in grasping only one of the covers by an individual or a machine. The uneven spacing of the denesting lugs 334 may reduce the likelihood that the denesting lugs of one cover will align with and fit into the denesting lugs of another cover stacked the cover, which would cause the denesting lugs to fail to provide the intended spacing between the two covers.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

To the extent that they are not inconsistent with the specific teachings and definitions herein, all of the US patents, US patent application publications, US patent applications, referred to in this specification and/or listed in the Application Data Sheet, including but not limited to U.S. Patent Application Ser. No. 62/311,787, filed Mar. 22, 2016, are incorporated herein by reference in their entirety.

The invention claimed is:

1. A system of stacked food containers comprising:
    a first food container comprising a base, the base including:
        an upwardly facing food receiving portion to receive a food product, wherein the upwardly facing food receiving portion includes a perimeter and a substantially planar surface; and
        at least a portion of a rim is disposed at the perimeter of the upwardly facing food receiving portion, wherein the at least a portion of a rim is raised relatively above the upwardly facing food receiving portion;
        wherein the upwardly facing food receiving portion further includes:
            a plurality of sector portions, including a first and second sector portion, angularly arrayed with respect to one another, each of the sector portions having an upward facing surface and a plurality of raised projections extending upwardly from the upward facing surface, and the first sector portion having a first sector well and the second sector portion having a second sector well, the second sector well being separate and distinct from the first sector well, wherein the first sector well and the second sector well each extend downwardly from a planar surface of the food receiving portion;
            a plurality of channels that delineate respective pairs of the sector portions from one another, each channel of the plurality of channels extending relatively below the upward facing surface of the sector portions; and
            a central well about which the sector portions are angularly arrayed, the central well having a perimeter and extending relatively below the upward facing surface of the sector portions, and each channel of the plurality of channels extending to the perimeter of the central well such that each channel is spaced apart from the other channels around the perimeter of the well; and
    a second food container comprising a cover, the cover including:
        a substantially downward facing interior surface and a substantially upward facing exterior surface, wherein the cover is sized and shaped to provide an interior chamber which protects the food product; and
        a central dome portion having a first dome recess sized and shaped to receive at least a portion of the first sector well and a second dome recess sized and shaped to receive at least a portion of the second sector well, wherein the first sector well of the base is engaged with at least a portion of the first dome recess sized and the second sector well of the base is engaged with at least a portion of the second dome recess; and
    an air space formed at least in part by the engagement of the first sector well of the base with at least a portion of the first dome recess and the engagement of the second sector well of the base with at least a portion of the second dome recess, wherein the air space is disposed between the base of the first food container and the substantially upward facing exterior surface of the cover of the second food container.

2. The system of stacked food containers of claim 1 wherein the base comprises sugarcane fiber, wood fiber, or bamboo fiber.

3. The system of stacked food containers of claim 1 wherein the cover includes a tab that extends radially outward from the cover.

4. The system of stacked food containers of claim 1 wherein the base is formed from a first single layer of material having a thickness in the range of 0.5 millimeters to 1.0 millimeters and the cover is formed from a second single layer of material having a thickness in the range of 0.5 millimeters to 1.0 millimeters.

5. The system of stacked food containers of claim 4 wherein the first single layer of material has a thickness of 0.8 millimeters and the second single layer of material has a thickness of 0.8 millimeters.

6. The system of stacked food containers of claim 1 wherein the first sector well that may receive liquid drippings from the food product therein.

7. The system of stacked food containers of claim 1 wherein the exterior surface of the cover has a circular raised outer rim spaced radially outward from a center of the cover and a circular raised inner rim spaced radially outward from the center of the cover and spaced radially inward from the raised outer rim.

8. The system of stacked food containers of claim 1 wherein the base includes a plurality of recesses that extend relatively below an adjacent portion of the base, the plurality of recesses positioned radially outward of the upwardly facing food receiving portion.

9. A food container comprising:
a base including:
an upwardly facing food receiving portion, the upwardly facing food receiving portion having an inner surface and a perimeter;
a plurality of radial channels running radially in the inner surface and terminating at a perimeter of a central well such that each radial channel of the plurality of radial channels is spaced apart from the other channels of the plurality of channels around the perimeter of the well; and
a corresponding plurality of sector portions of the upwardly facing food receiving portion delineated by the plurality of radial channels; and
a cover selectively engageable with the base, the cover including a substantially downward facing interior surface and a substantially upward facing exterior surface, the cover sized and shaped to provide an interior chamber to protect the food product, and the cover further having a central dome portion having a first dome recess sized and shaped to receive at least a portion of a first sector well of another base and a second dome recess sized and shaped to receive at least a portion of a second sector well that is separate and distinct from the first sector well of the another base, such that the cover is capable of engaging with another base to form an air pocket.

10. The food container of claim 9 wherein the base includes at least a portion of a raised rim disposed about a perimeter of the upwardly facing food receiving portion, and the interior surface of the cover includes at least a portion of a channel disposed about a perimeter of the cover that is sized and dimensioned to engage the at least a portion of the raised rim of the base when the cover is engaged with the base.

11. The food container of claim 10, further comprising:
indicia positioned on or adjacent the rim to aid a user in cutting the food product into pieces along the radial channels.

12. The food container of claim 9 wherein the interior surface of the cover includes at least a portion of a rim disposed about a perimeter of the cover, and
the base includes at least a portion of a channel disposed about a perimeter of the upwardly facing food receiving portion that is sized and dimensioned to engage the at least a portion of the rim of the cover when the cover is engaged with the base.

13. The food container of claim 9 wherein the exterior surface of the cover has a circular raised outer rim spaced radially outward from a center of the cover and a circular raised inner rim spaced radially outward from the center of the cover and spaced radially inward from the raised outer rim.

14. The food container of claim 9 wherein the base includes a plurality of recesses that extend relatively below an adjacent portion of the base, the plurality of recesses positioned radially outward of the upwardly facing food receiving portion.

15. A food container comprising:
a base including:
an upwardly facing food receiving portion, the upwardly facing food receiving portion having an inner surface and a plurality of channels disposed in the inner surface;
a central well having a perimeter disposed about the center of the upwardly facing food receiving portion, wherein each channel of the plurality of channels terminates at the central well such that each channel is spaced apart from other channels of the plurality of channels; and
a cover selectively engageable with the base, the cover including a substantially downward facing interior surface and a substantially upward facing exterior surface,
the exterior surface having a circular raised outer rim spaced radially outward from a center of the cover and a circular raised inner rim spaced radially outward from the center of the cover and spaced radially inward from the raised outer rim, the raised inner rim being lower in height than the raised outer rim, and
the cover sized and shaped to provide an interior chamber to protect the food product, and the cover further having a central dome portion having a first dome recess sized and shaped to receive at least a portion of a first sector well of another base and a second dome recess sized and shaped to receive at least a portion of a second sector well that is separate and distinct from the first sector well of the another base, such that the cover is capable of engaging with another base to form an air pocket.

16. The food container of claim 15 wherein the exterior surface of the cover further includes a circular groove positioned radially between the raised outer rim and the raised inner rim.

17. The food container of claim 15 wherein the exterior surface of the cover further includes a substantially planar ceiling portion positioned radially inward of the raised inner rim.

18. The food container of claim 15 wherein the base includes a plurality of recesses that extend relatively below an adjacent portion of the base, the plurality of recesses positioned radially outward of the upwardly facing food receiving portion.

19. A food container comprising:
a base including:
an upwardly facing food receiving portion that receives a food product, the food receiving portion having an inner surface;
a plurality of channels disposed in the inner surface:
a central well disposed about the center of the food receiving portion, wherein each channel of the plurality of channels terminates at the central well such that each channel is spaced apart from other channels of the plurality of channels; and
a plurality of recesses that extend relatively below an adjacent portion of the base, the plurality of recesses positioned radially outward of the upwardly facing food receiving portion; and
a cover selectively engageable with the base, the cover including a substantially downward facing interior surface and a substantially upward facing exterior surface, the cover sized and shaped to provide an interior chamber to protect the food product, and the cover further having a central dome portion having a first dome recess sized and shaped to receive at least a portion of a first sector well of another base and a second dome recess sized and shaped to receive at least a portion of a second sector well that is separate and distinct from the first sector well of the another base, such that the cover is capable of engaging with another base to form an air pocket.

20. The food container of claim 19 wherein each of the recesses has a depth greater than 5 millimeters and a diameter greater than 8 millimeters.

21. The food container of claim 19 wherein each of the recesses is dome shaped.

22. The food container of claim 19 wherein the plurality of recesses includes exactly eight recesses.

23. The food container of claim 19, wherein the substantially downward facing interior surface of the cover has a plurality of downwardly extending protrusions corresponding to the plurality of recesses, each of the plurality of protrusions being receivable by a respective one of the plurality of recesses to selectively engage the cover with the base.

* * * * *